United States Patent
Feil et al.

(10) Patent No.: US 11,776,260 B2
(45) Date of Patent: Oct. 3, 2023

(54) FACILITY OCCUPANCY DETECTION WITH THERMAL GRID SENSOR

(71) Applicants: Zurn Industries, LLC, Milwaukee, WI (US); WhiffAway Ltd, High Wycombe (GB)

(72) Inventors: Brandon Feil, Milwaukee, WI (US); Anthony G. Wilcox, Milwaukee, WI (US); Arindam Chakraborty, Milwaukee, WI (US); Glen Trickle, Milwaukee, WI (US); James McLean, High Wycombe (GB); Sebastian Marshall, Queensmead Road (GB); Paul Johnston, High Wycombe (GB)

(73) Assignees: WHIFFAWAY LTD, High Wycombe (GB); ZURN INDUSTRIES, LLC, Milwaukee, WI (US)

( * ) Notice: Subject to any disclaimer, the term of this patent is extended or adjusted under 35 U.S.C. 154(b) by 0 days.

(21) Appl. No.: 17/447,659

(22) Filed: Sep. 14, 2021

(65) Prior Publication Data

US 2022/0191984 A1    Jun. 16, 2022

Related U.S. Application Data

(63) Continuation of application No. 17/121,487, filed on Dec. 14, 2020, now Pat. No. 11,153,945.

(51) Int. Cl.
*G06V 20/40* (2022.01)
*H05B 45/18* (2020.01)
(Continued)

(52) U.S. Cl.
CPC .............. *G06V 20/40* (2022.01); *H05B 45/18* (2020.01); *H05B 45/22* (2020.01); *H05B 45/28* (2020.01)

(58) Field of Classification Search
CPC ........ H05B 45/18; H05B 45/22; H05B 45/28; H05B 45/20; H05B 47/13; G06V 20/13;
(Continued)

(56) References Cited

U.S. PATENT DOCUMENTS

| | | |
|---|---|---|
| 4,563,780 A | 1/1986 | Pollack |
| 4,805,247 A | 2/1989 | Laverty, Jr. |

(Continued)

FOREIGN PATENT DOCUMENTS

| | | |
|---|---|---|
| CN | 101702035 A | 5/2010 |
| CN | 112258542 A | 1/2021 |

(Continued)

OTHER PUBLICATIONS

Sudo et al., English translation of WO-2020184077-A1, Sep. 17, 2020 (Year: 2020).*

(Continued)

*Primary Examiner* — Daniel D Chang
(74) *Attorney, Agent, or Firm* — Husch Blackwell LLP

(57) ABSTRACT

Systems, methods and apparatus for providing an availability status associated with a facility. One system includes an illumination indicator, a thermal grid array sensor, and an electronic controller. The thermal grid array sensor is configured to sense an outside region, an entryway region, and an inside region associated with a facility subsystem. The electronic controller is configured to determine the current availability status as unavailable responsive to the thermal grid array sensor detecting a heat signature in the outside region, subsequently in the entryway region, and subsequently in the inside region. The electronic controller is also configured to determine the current availability status as available responsive to the thermal grid array sensor detecting the heat signature in the inside region, subsequently in the entryway region, and subsequently in the outside region.

(Continued)

The electronic controller is further configured to control the illumination indicator to indicate the current availability status.

18 Claims, 13 Drawing Sheets

(51) Int. Cl.
*H05B 45/28* (2020.01)
*H05B 45/22* (2020.01)

(58) Field of Classification Search
CPC ....... G06V 20/40; F21V 7/041; F21V 23/009; F21V 23/0471; F21Y 2103/33; F21Y 2115/10; Y02B 20/40; F21S 8/04
See application file for complete search history.

(56) References Cited

U.S. PATENT DOCUMENTS

| | | |
|---|---|---|
| 5,217,035 A | 6/1993 | Van Marcke |
| 5,438,714 A | 8/1995 | Shaw |
| 5,612,890 A | 3/1997 | Strasser et al. |
| 5,655,961 A | 8/1997 | Acres et al. |
| 5,838,258 A | 11/1998 | Saar |
| 5,844,808 A | 12/1998 | Konsmo et al. |
| 6,018,827 A | 2/2000 | Shaw et al. |
| 6,038,519 A | 3/2000 | Gauthier et al. |
| 6,189,163 B1 | 2/2001 | Van Marcke |
| 6,236,953 B1 | 5/2001 | Segal |
| 6,337,635 B1 | 1/2002 | Ericksen et al. |
| 6,347,414 B2 | 2/2002 | Contadini et al. |
| 6,411,920 B1 | 6/2002 | McConnell et al. |
| 6,583,720 B1 | 6/2003 | Quigley |
| 6,642,843 B2 | 11/2003 | Satoh |
| 6,694,177 B2 | 2/2004 | Eggers et al. |
| 6,701,194 B2 | 3/2004 | Gauthier et al. |
| 6,749,122 B1 | 6/2004 | Koenck et al. |
| 6,766,221 B1 | 7/2004 | Christiansen |
| 6,769,443 B2 | 8/2004 | Bush |
| 6,956,498 B1 | 10/2005 | Gauthier et al. |
| 6,967,565 B2 | 11/2005 | Lingemann |
| 7,023,341 B2 | 4/2006 | Stilp |
| 7,053,767 B2 | 5/2006 | Petite et al. |
| 7,058,457 B2 | 6/2006 | Kuwahara et al. |
| 7,119,658 B2 | 10/2006 | Stilp |
| 7,143,007 B2 | 11/2006 | Long et al. |
| 7,177,725 B2 | 2/2007 | Nortier et al. |
| 7,222,111 B1 | 5/2007 | Budike, Jr. |
| 7,226,496 B2 | 6/2007 | Ehlers |
| 7,302,313 B2 | 11/2007 | Sharp et al. |
| 7,304,569 B2 | 12/2007 | Marcichow |
| 7,360,413 B2 | 4/2008 | Jeffries et al. |
| 7,755,493 B2 | 7/2010 | Berenguer et al. |
| 7,814,582 B2 | 10/2010 | Reddy et al. |
| 8,028,355 B2 | 10/2011 | Reeder et al. |
| 8,141,296 B2 | 3/2012 | Bem |
| 8,284,018 B2 | 10/2012 | Ibsies |
| 8,364,546 B2 | 1/2013 | Yenni et al. |
| 8,407,821 B2 | 4/2013 | Chan |
| 8,970,391 B2 | 3/2015 | Hoekstra |
| 9,240,111 B2 | 1/2016 | Scott et al. |
| 9,266,136 B2 | 2/2016 | Klicpera |
| 9,429,453 B1 | 8/2016 | O'Keeffe et al. |
| 9,574,374 B2 | 2/2017 | Klevens et al. |
| 9,659,481 B2 | 5/2017 | Himmelmann et al. |
| 9,830,565 B2 | 11/2017 | O'Toole |
| 9,939,299 B2 | 4/2018 | Patel et al. |
| 9,956,306 B2 | 5/2018 | Brais et al. |
| 9,959,781 B2 | 5/2018 | Roark |
| 9,963,863 B2 | 5/2018 | Allard, III |
| 9,965,938 B1 | 5/2018 | Cronin et al. |
| 10,066,379 B2 | 9/2018 | Schomburg |
| 10,081,968 B2 | 9/2018 | Klevens et al. |
| 10,264,588 B2 | 4/2019 | Wegelin et al. |
| 10,276,018 B2 | 4/2019 | Brillaud |
| 10,329,744 B2 | 6/2019 | Abdel-Fattah et al. |
| 10,361,802 B1 | 7/2019 | Hoffberg-Borghesani et al. |
| 10,430,737 B2 | 10/2019 | Yenni et al. |
| 10,460,582 B2 | 10/2019 | Anderholm et al. |
| 10,485,388 B1 | 11/2019 | McIntosh |
| 10,504,070 B2 | 12/2019 | Jacobson |
| 10,504,355 B2 | 12/2019 | Wegelin et al. |
| 10,514,110 B2 | 12/2019 | Allard, III |
| 10,527,191 B2 | 1/2020 | Bush et al. |
| 10,529,167 B2 | 1/2020 | Khamphilapanyo et al. |
| 10,529,219 B2 | 1/2020 | Herdt et al. |
| 11,105,705 B1 | 8/2021 | Lowitz et al. |
| 11,108,865 B1 | 8/2021 | Chakraborty et al. |
| 11,153,945 B1 | 10/2021 | Feil et al. |
| 11,307,570 B2 | 4/2022 | Trinh et al. |
| 2002/0007510 A1 | 1/2002 | Mann |
| 2002/0053969 A1 | 5/2002 | Wagner et al. |
| 2002/0099454 A1 | 7/2002 | Gerrity |
| 2006/0007008 A1 | 1/2006 | Kates |
| 2006/0208862 A1 | 9/2006 | Lahr et al. |
| 2009/0300988 A1 | 12/2009 | Bem |
| 2012/0235579 A1* | 9/2012 | Chemel .................. F21V 29/60 315/152 |
| 2014/0249854 A1 | 9/2014 | Moore et al. |
| 2014/0379305 A1 | 12/2014 | Kumar |
| 2015/0233146 A1 | 8/2015 | Klevens et al. |
| 2016/0258144 A1 | 9/2016 | Tayenaka et al. |
| 2016/0345406 A1 | 11/2016 | Donhowe et al. |
| 2017/0019970 A1 | 1/2017 | Chemel et al. |
| 2017/0038224 A1 | 2/2017 | O'Keeffe et al. |
| 2017/0122005 A1 | 5/2017 | Klevens et al. |
| 2017/0129383 A1 | 5/2017 | Buka et al. |
| 2017/0223807 A1 | 8/2017 | Recker et al. |
| 2017/0346651 A1 | 11/2017 | Somajini |
| 2018/0198639 A1 | 7/2018 | Ishizaka |
| 2018/0217292 A1 | 8/2018 | Grosse-Puppendahl |
| 2018/0293877 A1 | 10/2018 | Barth |
| 2018/0354777 A1 | 12/2018 | Slater et al. |
| 2019/0001863 A1 | 1/2019 | Taylor |
| 2019/0051214 A1 | 2/2019 | Roark |
| 2019/0351442 A1 | 11/2019 | McNulty et al. |
| 2019/0353278 A1 | 11/2019 | Bush et al. |
| 2019/0354535 A1 | 11/2019 | Amin et al. |
| 2019/0359477 A1 | 11/2019 | Wegelin et al. |
| 2019/0360184 A1 | 11/2019 | Lawinger |
| 2019/0362617 A1 | 11/2019 | Bonner et al. |
| 2019/0387058 A1 | 12/2019 | Heller |
| 2019/0392377 A1 | 12/2019 | Munir et al. |
| 2020/0011005 A1 | 1/2020 | Okumura et al. |
| 2020/0032497 A1 | 1/2020 | Wu |
| 2020/0097030 A1 | 3/2020 | Carlson |
| 2020/0098199 A1 | 3/2020 | Bullock |
| 2020/0099679 A1 | 3/2020 | Carlson |
| 2020/0140254 A1 | 5/2020 | Slater et al. |
| 2020/0141773 A1 | 5/2020 | Burke et al. |
| 2020/0145257 A1 | 5/2020 | Samudrala |
| 2020/0217057 A1 | 7/2020 | Spiro et al. |
| 2020/0232832 A1 | 7/2020 | Burke et al. |
| 2020/0253187 A1 | 8/2020 | Flies et al. |
| 2020/0314866 A1 | 10/2020 | Wegelin et al. |
| 2020/0358852 A1 | 11/2020 | Burke et al. |
| 2020/0404357 A1 | 12/2020 | Kulkarni et al. |
| 2021/0027402 A1 | 1/2021 | Davis et al. |
| 2021/0144210 A1 | 5/2021 | Kohapure et al. |
| 2021/0358293 A1 | 11/2021 | Tournier et al. |
| 2022/0020249 A1 | 1/2022 | Castellano |
| 2022/0107632 A1 | 4/2022 | Sinha et al. |

FOREIGN PATENT DOCUMENTS

| | | | |
|---|---|---|---|
| GB | 2562872 A | * 11/2018 | ............. G08B 21/22 |
| JP | H0357993 A | 3/1991 | |
| JP | H07284180 A | 10/1995 | |
| JP | H07311280 A | 11/1995 | |
| JP | 2002021149 A | 1/2002 | |
| JP | 2002148354 A | 5/2002 | |
| JP | 2004117250 A | 4/2004 | |

(56) References Cited

FOREIGN PATENT DOCUMENTS

| | | | | |
|---|---|---|---|---|
| JP | 2004258927 A | 9/2004 | | |
| JP | 4443710 B2 | 3/2010 | | |
| JP | 2010216821 A | 9/2010 | | |
| JP | 2019083360 A | 5/2019 | | |
| JP | 2020012303 A | 1/2020 | | |
| JP | 2020051757 A | 4/2020 | | |
| JP | 2021092094 A | 6/2021 | | |
| KR | 20060087797 A | 8/2006 | | |
| KR | 101137918 B1 | 4/2012 | | |
| KR | 102079443 B1 | 12/2019 | | |
| KR | 20220034403 A | 3/2022 | | |
| TW | I727415 B | 5/2021 | | |
| WO | WO1996041058 A1 | 12/1996 | | |
| WO | WO2002056540 A2 | 7/2002 | | |
| WO | 2017113643 A1 | 7/2017 | | |
| WO | 2020120975 A2 | 6/2020 | | |
| WO | WO-2020184077 A1 | * | 9/2020 | G01J 5/14 |
| WO | 2022036397 A1 | 2/2022 | | |

OTHER PUBLICATIONS

J. Yun et al., "Detecting Direction of Movement Using Pyroelectric Infrared Sensors," in IEEE Sensors Journal, vol. 14, No. 5, pp. 1482-1489, May 2014.

K. Lai et al., "Using cooperative PIR sensing for human indoor localization," 2018 27th Wireless and Optical Communication Conference (WOCC), pp. 1-5.

Acuitycontrols, "nLight Network Lighting Control," Copyright 2014, (78 Pages).

AcuityControls, "SensorView Manual," Nov. 3, 2015, (123 Pages).

Chang et al., "Microprocessor Applications and Building Control Systems to Achieve Energy Conservation," U.S. Department of Commerce and National Bureau of Standards, Jul. 1980, (54 pages).

Gami, "Movement Direction and Distance Classification Using a Single PIR Sensor," in IEEE Sensors Letters, vol. 2, No. 1, Mar. 2018, pp. 1-4.

GE, "Lightsweep Lighting Control System," Product Literature, Dec. 8, 2015, (12 Pages).

Jiang et al., "Residential House Occupancy Detection: Trust-Based Scheme Using Economic and Privacy-Aware Sensors," in IEEE Internet of Things Journal, vol. 9, No. 3, Feb. 1, 2022, pp. 1938-1950.

Johnson Controls, "Metasys® for Validated Environments (MVE)," Product Bulletin, Dec. 15, 2001, (13 pages).

Lighting Answers, "Controlling Lighting with Building Automation Systems," vol. 4, No. 1, May 1997, <https://www.lightingassociates.org/i/u/2127806/f/tech_sheets/Lighting_Control.pdf>, (8 pages).

Lutron, "Quantum Unlimited Capability for High-Performance Buildings," Product Literature, P/N 367-1321, Apr. 2018, (20 Pages).

Lutron, "What is Lighting Control System", Product Literature 366-396h, Publicly available prior to Nov. 19, 2020, (19 Pages).

Perra et al., "Monitoring Indoor People Presence in Buildings Using Low-Cost Infrared Sensor Array in Doorways", Sensors 2021,21,4062., Published Jun. 12, 2021 (19 Pages).

Shankar et al., "Human-tracking systems using pyroelectric infrared detectors", Optical Engineering 45(10), Oct. 2006, (10 Pages).

Trane, "Tracer™ SC System Controller for Tracer Building Automated Systems," Product Catalog, P/N BAS-PRC031-EH, Jun. 10, 2013, (27 Pages).

Wang et al., "A Lightweight People Counting Approachfor Smart Buildings," 2021 13th International Conference on Wireless Communications and Signal Processing (WCSP), pp. 1-5.

Wiatrowski, "Microprocessor Restroom Robot," Computer Design the Magazine of Digital Electronics, Apr. 1977, pp. 98-100, (3 pages).

Yang et al. "A novel low-cost and small-size human tracking system with pyroelectric infrared sensor mesh network," Infrared Physics & Technology, vol. 63, Mar. 2014, pp. 147-156.

Yun et al., "Human Movement Detection and Identification Using Pyroelectric Infrared Sensors" Sensors 14, No. 5, website: https://doi.org/10.3390/s 140508057, Published May 4, 2014, pp. 8057-8081.

Tooshlights, "Small upgrade. Big improvement, How it works", Copyright 2021 product brochure, (6 Pages).

Haitian, "Thingsee PRESENCE" webpage: https://haltian.com/product/thingsee-presence/, publicly available at least as early as Nov. 10, 2020 (2 Pages).

Occupancy Lights, Social Distancing Technology, Powerpoint Page, publicly available at least as early as Nov. 10, 2020.

Density, "Introducing Density Open Area" website: https://www.density.io/, dated Oct. 8, 2020 (7 Pages).

Tooshlights, Product website: https://tooshlights.com/products/, Copyright 2021, (11 Pages).

International Search Report with Written Opinion for related Application No. PCT/US2020/59873 dated Mar. 12, 2021 (14 Pages).

Office Action issued from the US Patent Office for related U.S. Appl. No. 17/094,583 dated Jul. 6, 2021 (10 Pages).

* cited by examiner

FACILITY OCCUPANCY DETECTION WITH THERMAL GRID SENSOR

CROSS-REFERENCE TO RELATED APPLICATIONS

This application is a continuation of U.S. patent application Ser. No. 17/121,487, filed on Dec. 14, 2020, the entire contents of which are incorporated herein by reference.

FIELD

Implementations of the present disclosure relate to occupancy detection, and, more particularly, to determining an availability status associated with a facility via thermal grid-based detection.

BACKGROUND

In busy airports and commercial facilities, there is always huge amount of traffic going in and out of the public restrooms (or bathrooms). Without the presence of any kind of occupancy indicator or tracker, it is hard for customers to know which restrooms are available and which are not (e.g., which restroom stall therein is available). With the presence of occupancy indicators (e.g., a visual indicator light) a customer can easily identify available restroom stalls from a far distance. Some occupancy detection systems use door latch sensors. However, these systems are not self-contained and require expensive and time-consuming retrofitting of bathroom stall doors. Further, these systems are susceptible to errors. As one example, a door latch sensor may erroneously indicate that a bathroom stall is available because an occupant forgot to lock the door. As a further example, door latch sensors are prone to installation errors.

SUMMARY

The present disclosure provides systems, methods, and apparatuses that provide, among other things, occupancy detection using a thermal grid array sensor. When installed above an entryway of a facility, a thermal grid array sensor detects areas of elevated temperature (e.g., caused by human body temperature) and determines the movement of those elevated temperatures over time. The occupancy of the facility can be determined based on the direction of movement of a heat signature. For example, a movement of a heat signature from the outside to the inside of a facility indicates that the facility is occupied, and thus is unavailable. Further, a movement of a heat signature from the inside to the outside of a facility indicates that the facility is vacant, and thus is available.

For example, the present disclosure provides a system for providing an availability status associated with a facility. In one implementation, the system includes an illumination indicator, a thermal grid array sensor, and an electronic controller. The illumination indicator is associated with a facility subsystem of the facility. The thermal grid array sensor is configured to sense an outside region located outside of the facility subsystem. The thermal grid array sensor is also configured to sense an entryway region located in an entryway of the facility subsystem. The thermal grid array sensor is further configured to sense an inside region located inside of the facility subsystem. The electronic controller is communicatively coupled to the illumination indicator and the thermal grid array sensor. The electronic controller is configured to determine a current availability status associated with the facility subsystem as unavailable responsive to the thermal grid array sensor detecting a heat signature in the outside region, subsequently detecting the heat signature in the entryway region, and subsequently detecting the heat signature in the inside region. The electronic controller is also configured to determine the current availability status associated with the facility subsystem as available responsive to the thermal grid array sensor detecting the heat signature in the inside region, subsequently detecting the heat signature in the entryway region, and subsequently detecting the heat signature in the outside region. The electronic controller is further configured to control the illumination indicator to indicate the current availability status associated with the facility subsystem.

The present disclosure also provides a method for providing an availability status associated with a facility. The method includes determining, with an electronic controller, a current availability status associated with a facility subsystem of the facility as unavailable responsive to a thermal grid array sensor detecting a heat signature in an outside region located outside of the facility subsystem, subsequently detecting the heat signature in an entryway region located in an entryway of the facility subsystem, and subsequently detecting the heat signature in an inside region located inside of the facility subsystem. The method also includes determining, with the electronic controller, the current availability status associated with the facility subsystem as available responsive to the thermal grid array sensor detecting the heat signature in the inside region, subsequently detecting the heat signature in the entryway, and subsequently detecting the heat signature in the outside region. The method further includes controlling, with the electronic controller, an illumination indicator associated with the facility subsystem to indicate the current availability status associated with the facility subsystem.

The present disclosure further provides an apparatus for providing an availability status associated with a facility. In one implementation, the apparatus includes an illumination indicator, a thermal grid array sensor, and an electronic controller. The illumination indicator is associated with a facility subsystem of the facility. The thermal grid array sensor is configured to sense an outside region located outside of the facility subsystem. The thermal grid array sensor is also configured to sense an entryway region located in an entryway of the facility subsystem. The thermal grid array sensor is further configured to sense an inside region located inside of the facility subsystem. The electronic controller is communicatively coupled to the illumination indicator and the thermal grid array sensor. The electronic controller is configured to determine a current availability status associated with the facility subsystem as unavailable responsive to the thermal grid array sensor detecting a heat signature in the outside region, subsequently detecting the heat signature in the entryway region, and subsequently detecting the heat signature in the inside region. The electronic controller is also configured to determine the current availability status associated with the facility subsystem as available responsive to the thermal grid array sensor detecting the heat signature in the inside region, subsequently detecting the heat signature in the entryway region, and subsequently detecting the heat signature in the outside region. The electronic controller is further configured to control the illumination indicator to indicate the current availability status associated with the facility subsystem.

The present disclosure also provides a visual indicator operable to indicate locally an availability status of a facility. The visual indicator includes at least one local illumination unit operable to display at least two separate colours, where each colour represents a different availability status of the facility. The visual indicator also includes an infrared sensor unit, which is configured to detect motion of a person entering and leaving the facility. The sensor is operable to detect heat (infrared rays) of the person passing through predetermined detection zones. The visual indicator further includes a zone controller, which is operable to configure the detection zones according to a layout and confines of the facility, such that a person cannot evade the infrared sensor unit.

The zone controller may include a switch member, which is configured to activate and deactivate zones associated with a field of view of the infrared sensor thereby configuring the detection zones.

The visual indicator may include a light reflector operable to boost the illuminated colour. The light reflector may be defined by a conical member.

The visual indicator may further comprise a diffuser, which is operable to dim the illuminated colour. The diffuser may be a unit which envelops the light reflector.

The visual indicator may be surface mountable. The visual indicator may include a fixing configured to attach the visual indicator to a surface in an elevated position. The surface may be a ceiling, wall, door, framework etc. The visual indicator may be configured to be mounted vertically, wherein the visual indicator comprises a fixing configured to attach the visual indicator to a ceiling.

The fixing may comprise at least two retaining springs. Alternatively, the fixing may comprise a plurality of toggle fixings, wherein, in use, the toggle fixings retain the visual indicator against an exterior surface of the ceiling.

A further aspect of the present disclosure provides a visual indication system comprising a plurality of visual indicators according to the first aspect, a controller communicatively coupled to each visual indicator and a remote display unit, wherein the controller is configured to receive data from each sensor, determine a real-time availability status based on the data received from each sensor, control illumination of each illumination unit to indicate locally the real-time availability status of each visual indicator and to transmit to the remote display unit the status of each visual indicator such that the status of each visual indicator can be displayed remotely via the remote display unit.

The controller may be configured to control each visual indicator to display a first colour when the real time availability status is unavailable and a second colour when the real time availability status is available, wherein the first colour is different from the second colour.

The controller may be configured to override one or more visual indicators to display a third colour when the real time availability is suspended thereby indicating the status of the one or more visual indicator as inaccessible.

Occupancy detection with a thermal grid array sensor provides more accurate occupancy detection than other systems (such as door latch sensors). Further, an occupancy detection apparatus with a thermal grid array sensor can be self-contained for easy installation and ongoing maintenance. In addition, a thermal grid sensor array generates heat data, not image data. Thus, a thermal grid array sensor can be employed in nearly any type of facility (including privacy-sensitive facilities such as bathrooms and locker rooms).

Other aspects and implementations will become apparent by consideration of the detailed description and accompanying drawings.

DETAILED DESCRIPTION

Before any implementations of the present disclosure are explained in detail, it is to be understood the implementations are not limited in their application to the details of construction and the arrangement of components set forth in the following description or illustrated in the following drawings. Other implementations are possible, and implementations described and/or illustrated here are capable of being practiced or of being carried out in various ways.

It should also be noted that a plurality of hardware and software-based devices, as well as a plurality of different structural components may be used to implement the implementations. In addition, implementations may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one implementation, the electronic based aspects of the invention may be implemented in software (for example, stored on non-transitory computer-readable medium) executable by one or more processors. As such, it should be noted that a plurality of hardware and software-based devices, as well as a plurality of different structural components may be utilized to implement various implementations. It should also be understood that although certain drawings illustrate hardware and software located within particular devices, these depictions are for illustrative purposes only. In some implementations, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
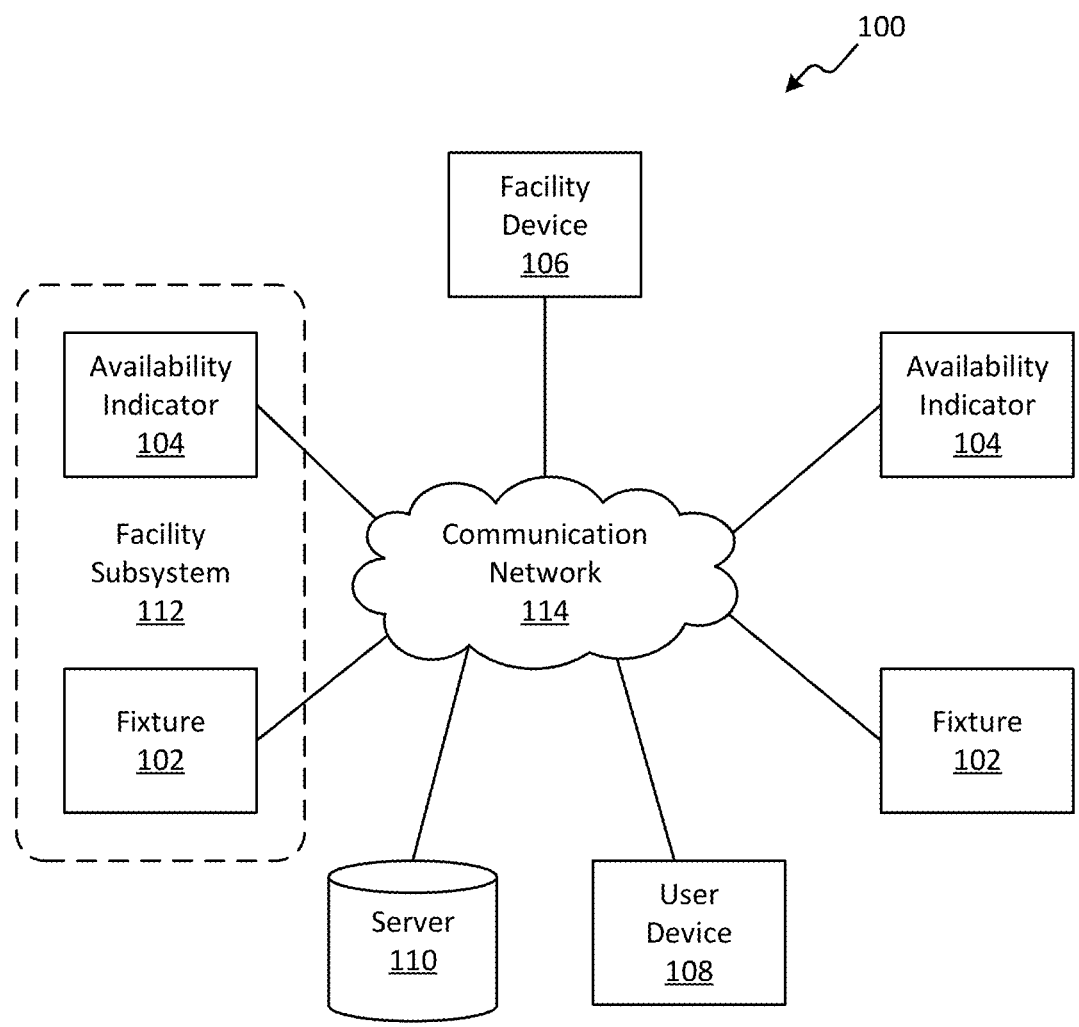
FIG. 1 is a block diagram of an example of a system for providing an availability status associated with a facility according to some implementations

FIG. 1 is a block diagram of an example of a system 100 for providing an availability status associated with a facility. The system 100 illustrated in FIG. 1 includes fixtures 102, availability indicators 104, a facility device 106, a user device 108, and a server 110 (e.g., cloud-based server). In some implementations, the system 100 includes fewer, additional, or different components than illustrated in FIG. 1 in various configurations. For example, the system 100 may include multiple facility devices 106, user devices 108, servers 110, or a combination thereof. Additionally, the system 100 may include any number of fixtures 102 and/or availability indicators 104 and the two fixtures and availability indicators illustrated in FIG. 1 are purely for illustrative purposes.

As illustrated in FIG. 1, in some implementations, one or more components of the system 100 may be included within a facility subsystem 112. In the example illustrated in FIG. 1, the facility subsystem 112 includes the fixture 102 and the availability indicator 104. In some implementations, the facility subsystem 112 includes fewer, additional, or different components than illustrated in FIG. 1 in various configurations. For example, the facility subsystem 112 may include multiple fixtures 102, availability indicators 104, or a combination thereof. As one example, the facility subsystem 112 may be a bathroom stall of a facility. According to this example, the bathroom stall (as the facility subsystem 112) may include a toilet (as the fixture 102) and a corresponding availability indicator 104. As another example, the facility subsystem 112 may be a handwashing station of the facility (e.g., a single handwashing station of a plurality of handwashing stations included in the facility). According to this example, the handwashing station (as the facility subsystem 112) may include a soap dispenser (as a first fixture) and a faucet (as a second fixture), and a corresponding availability indicator 104. Thus, in some implementations, a facility may include more than one facility subsystem 112.

A fixture 102 may include, for example, a faucet, a flushometer, a flush valve, a soap dispenser, a handwashing system, a water service line monitor, a backflow preventer, a floor drain, a hand dryer, a pressure sensor, a water use sensor, a flow sensor, a valve sensor, a lavatory, a toilet, a urinal, a water closet, a bottle and glass filler, a drain, a drinking water fountain, an air quality sensor, a backflow preventer, a leak detection sensor, an occupancy detection sensor, and a resource dispenser (e.g., a soap dispenser, a sanitizer dispenser, a room deodorizer dispenser, a paper tower dispenser, and the like), and the like. Thus, in some implementations, the fixture 102 is a water management solution.

Figure 2:
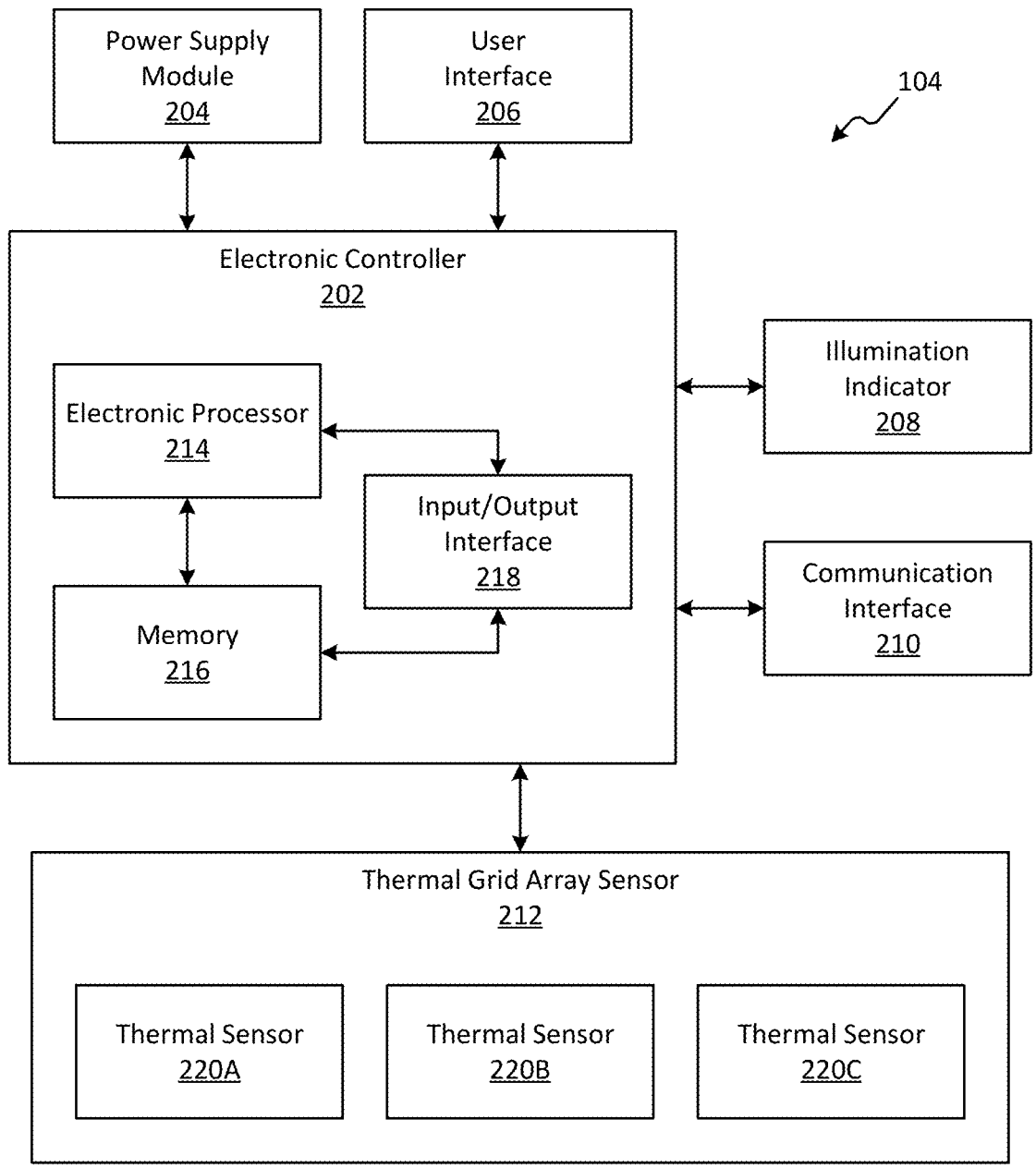
FIG. 2 is a block diagram of an example of an availability indicator included in the system of FIG. 1 according to some implementations.

FIG. 2 is a block diagram of an example of the availability indicator 104. The availability indicator 104 (also referred to herein as a "visual indicator") is operable to visually indicate the status of a facility (or a facility subsystem 112) in which the availability indicator 104 is installed. The availability indicator 104 illustrated in FIG. 2 includes an electronic controller 202, a power supply module 204, a user interface 206, an illumination indicator 208, a communication interface 210, and a thermal grid array sensor 212. The availability indicator 104 may include additional, different, or fewer components than those illustrated in FIG. 1 in various configurations. In some implementations, one or more components of the availability indicator 104 may be distributed among multiple devices, integrated into a single device, or a combination thereof. In some implementations, the availability indicator 104 may perform additional functionality other than the functionality described herein. Also, the functionality described herein as being performed by the availability indicator 104 (or a portion thereof) may be distributed among multiple devices.

The electronic controller 202 illustrated in FIG. 2 includes an electronic processor 214, a memory 216, and an input/output interface 218. The electronic processor 214 includes a microprocessor, an application-specific integrated circuit ("ASIC"), or another suitable electronic device for processing data. The memory 216 includes a non-transitory, computer-readable storage medium. The electronic processor 214 is configured to access and execute computer-readable instructions ("software") stored in the memory 216. The software may include firmware, one or more applications, program data, filters, rules, one or more program modules, and other executable instructions. For example, the software may include instructions and associated data for performing a set of functions, including the methods described herein. The input/output interface 218 includes routines for transferring information between components within the electronic controller 202 and other components of the availability indicator 104. The input/output interface 218 is configured to transmit and receive signals via wires, fiber, wirelessly, or a combination thereof. Signals may include, for example, control signals, information, data, serial data, data packets, analog signals, or a combination thereof.

The power supply module 204 supplies a nominal AC or DC voltage to the availability indicator 104. In some implementations, the power supply module 204 is powered by mains power having nominal line voltages between, for example, 100 Volt and 240 Volt AC and frequencies of approximately 50 Hertz to 60 Hertz. Alternatively, or in addition, the availability indicator 104 is powered by one or more batteries or battery packs. The power supply module 204 is configured to supply lower voltages to operate circuits and components within the availability indicator 104.

The user interface 206 may include one or more input devices, one or more output devices, or a combination thereof. Thus, in some implementations, the user interface 206 allows a user to interact with (e.g., provide input to and receive output from) the availability indicator 104. For example, the user interface 206 may include a touch screen, a mechanical button, a display device (e.g., a liquid crystal display ("LCD")), a printer, a speaker, a microphone, another input/output device, or a combination thereof. The user interface 206 may include a display device (not shown). The user interface 206 may be included in the same housing as the availability indicator 104 or may communicate with the availability indicator 104 over one or more wired or wireless connections. For example, in some implementations, the display device is a monitor, a television, or a projector positioned at or near an entry to a facility. In some implementations, the display device displays information, such as an occupancy level, a facility status, directions to an alternate facility, or facility subsystem, other facility related information, or a combination thereof.

The electronic controller 202 is configured to generate and transmit one or more control signals to the illumination indicator 208 based on a determined availability status. The illumination indicator 208 indicates the availability status. In some implementations, the illumination indicator 208 is a light (such as an LED light or the like). For example, the illumination indicator 208 may include a Tricolor PLCC6 Black Surface LED™, which allows three different colors of light to be emitted. The illumination indicator 208 may indicate the availability status by visually displaying (or illuminating) various colored lights as an indication of an availability status. As one example, the illumination indicator 208 may display a red light to indicate the availability status of "unavailable." As another example, the illumination indicator 208 may display a green light to indicate the availability status of "available." As a further example, In the present example the colours are red, green and blue; each colour indicates a different availability status of the facility to which the availability indicator 104 is attached.

The communication interface 210 allows the availability indicator 104 to communicate with devices external to the availability indicator 104. For example, as illustrated in FIG. 1, the availability indicator 104 may communicate with the fixture 102, the facility device 106, the user device 108, the server 110 or a combination thereof through the communication interface 210. The communication interface 210 may include a port for receiving a wired connection to an external device (e.g., a universal serial bus ("USB") cable and the like), a transceiver for establishing a wireless connection to an external device (e.g., over a communication network 114, such as the Internet, LAN, a WAN, such as a LoRa network or system, and the like), or a combination thereof. As one example, in some implementations, the communication interface 210 includes a port for receiving a wired connection between the availability indicator 104 and the facility device 106. As another example, in some implementations, the communication interface 210 includes a radio or transceiver for establishing a wireless connection, over a LoRa system or network, between the availability indicator 104 and the facility device 106.

When a person is present in a facility, their body temperature causes elevated heat levels in the facility. The thermal grid array sensor 212 includes a grid array of thermal sensors that detect a presence of a human occupant in a facility (or subsystem) by detecting elevated heat levels caused by the human occupant's body temperature. Thermal sensors may include, for example, a plurality of infrared sensors or any other sensors that detects heat. The thermal grid array sensor 212 illustrated in FIG. 2 includes three thermal sensors 220A, 220B, and 220C. The thermal grid array sensor 212 may include any number of thermal sensors and the three thermal sensors 220A, 220B, and 220C illustrated in FIG. 2 are purely for illustrative purposes. For example, the thermal grid array sensor 212 may include 64 thermal sensors arranged in an 8×8 grid array (such as the AGM88xx infrared array sensor grid-eye from Panasonic™).

Figure 3A:
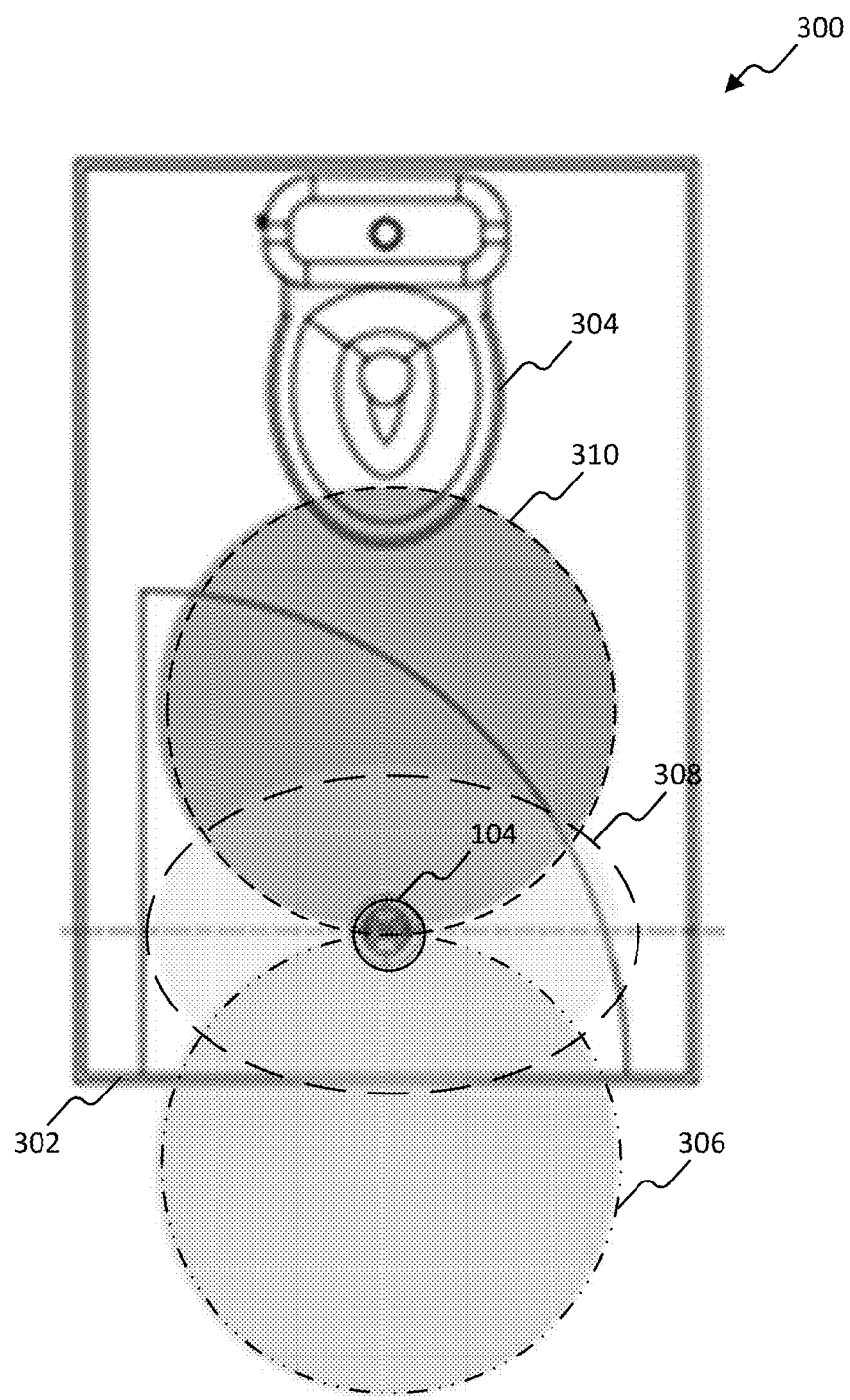
FIG. 3A is a top-down view of an example facility including an availability indicator according to some implementations.

The thermal grid array sensor 212 is configured to detect heat signatures in a multiple regions. In some implementations, the thermal grid array sensor 212 is configured to detect heat signatures in an outside region, an entryway region, and an inside region. In other implementations, the thermal grid array sensor 212 is configured to detect heat signatures in more than three regions. The outside region is located outside of a facility subsystem 112. The entryway region is located in an entryway of the facility subsystem 112. The inside region is located inside of the facility subsystem 112. The entryway region is located between the outside region and the inside region. For example, FIG. 3A illustrates a top-down view of an availability indicator 104 mounted to a ceiling of a lavatory cubicle 300 (one example of a facility subsystem 112). In the example illustrated in FIG. 3A, the availability indicator 104 is located on the ceiling of the lavatory cubicle 300 and is positioned inside the lavatory cubicle 300 between a door threshold 302 of the lavatory cubicle 300 and a lavatory bowl 304 (one example of a fixture 102). It should be appreciated the availability indicator 104 is ideally located in an elevated position and therefore could be located on a ceiling, wall, door, door frame etc. The thermal grid array sensor 212 included in the availability indicator 104 illustrated in FIG. 3A is configured to detect heat signatures within three regions 306, 308, and 310 (or zones). Region 306 (an example of an "outside region" or a "first zone") is located outside of the facility subsystem 112. Region 308 (an example of an "entryway region" or a "second zone") is located in an entryway of the facility subsystem 112. Region 308 (an example of an "inside region" or a "third zone") is located inside of the facility subsystem 112. In some implementations, thermal sensor 220A is configured to sense the outside region (e.g., region 306), thermal sensor 220B is configured to sense the entryway region (e.g., region 308), and thermal sensor 220C is configured to sense the inside region (e.g., region 310). In other implementations, more than one thermal sensor may be configured to sense each of the three regions. For example, the thermal grid array sensor 212 may include 64 thermal sensors arranged in an 8×8 grid array and a first group of thermal sensors is configured to sense the outside region, a second group of thermal sensor is configured to sense the entryway region, and a third group of thermal sensors is configured to sense the inside region. In some implementations, the outside region, the entryway region, and the inside region are arranged along a substantially-straight line. For example, the three regions 306, 308, and 310 illustrated in FIG. 3A are disposed along a generally-linear path. In some implementations, the outside region, the entryway region, and the inside region partially overlap. For example, in FIG. 3A, regions 306 and 308 partially overlap and regions 308 and 310 partially overlap. In other implementations, the outside region, the entryway region, and the inside region do not overlap.

In the illustrated example, the availability indicator 104 is configured to be responsive to movement through predetermined zones to ensure the availability indicator 104 is activated and to ensure its functionality cannot be evaded.

In the illustrated example, the availability indicator 104 utilises a thermal grid array sensor 212 (e.g., an infrared array sensor grid-EYE™ [by Panasonic]) to detect movement, wherein the thermal grid array sensor 212 is active i.e. always looking and track people in an area by measuring infrared energy/temperature in the environment and within the viewing angle of the thermal grid array sensor 212.

Figure 3B:
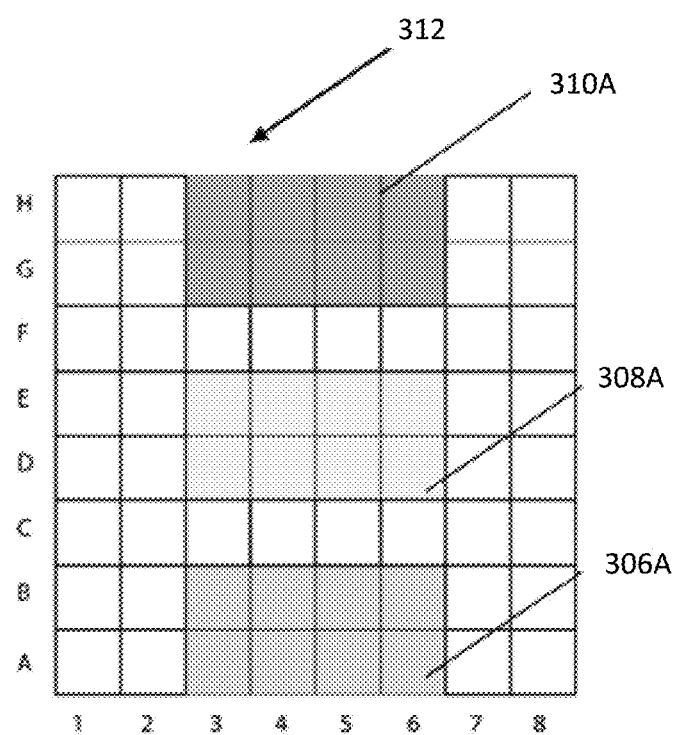
FIG. 3B is an example of a 64 pixel (8×8 grid) representing the viewing angle of a thermal grid array sensor used in some implementations of the availability indicator of FIG. 3A.

In some implementations, the viewing angle of the thermal grid array sensor 212 is a 60-degree cone, these form a 64 pixel (8×8 grid) i.e. 8 pixels×8 pixels grid 312 (see FIG. 3B). In the illustrated example each pixel is indicated as A1, A2 . . . , A8, B1, B2 . . . , B8, C1, C2 . . . , C8, D1, D2 . . . , D8, E1, E2 . . . , E8, F1, F2 . . . , F8, G1, G2 . . . , G8 and H1, H2 . . . , H8.

In FIG. 3A, a person moves through the three regions 306, 308, and 310 to be "seen" by the thermal grid array sensor 212. As indicated in FIG. 3A, the region 308 overlaps with each of the region 306 and the region 310 and the region extend approximately the full width of the lavatory cubicle 300. In FIG. 3B, the three regions 306, 308, and 310 are represented by the shaded grid references 306A, 308A, and 310A. The shaded grid references 306A, 308A, and 310A are selected from the 64-pixel grid such that the viewing zone is limited to the confines of the lavatory cubicle 300 and such that the user cannot evade detection by the thermal grid array sensor 212.

For a standard lavatory cubicle 300, as illustrated in FIG. 3A, the regions 306, 308, and 310 are defined by a modified sensor view, which utilises only a selection of the pixel grid 312. In the illustrated example, pixels A3 to A6 and B3 to B6 represents region 306, pixels D3 to D6 and E3 to E6 represent region 308 and pixels G3 to G6 and H3 to H6 represent region 310. In this example, pixels A1 to H1, A2 to H2, C1 to C8, F1 to F8, A7 to H7 and A8 to H8 are deselected/switched off. It will be appreciated that selectively switching pixels off or on allows management/manipulation of the viewing field.

Continuing with the example of a lavatory cubicle or block of lavatory cubicles, a corner cubicle represents an example of where the zones or viewing angle would be different from the regions 306, 308, and 310 and the shaded grid references 306A, 308A, and 310A represented in FIGS. 3A and 3B, respectively. For example, the entrance zone may be the same because the entrance doorway/passageway is typically uniform, but the area within the corner cubicle is typically wider and deeper than a standard cubicle. Therefore, to ensure sensing by the availability indicator 104 cannot be evaded the pixels are selected such that movement through the zones is captured by the thermal grid array sensor 212 of the availability indicator 104.

The electronic controller 202 determines an availability status for a corresponding facility subsystem 112 based on sensor data collected by the thermal grid array sensor 212. For example, using a restroom stall as the facility subsystem 112, when a heat signature is detected by the thermal grid array sensor 212 in the outside region and then in the entryway region and then in the inside region, the electronic controller 202 determines that an occupant is now present, and thus the restroom stall is unavailable. Further, when a heat signature is detected by the thermal grid array sensor 212 in the inside region and then in the entryway region and then in the outside region, the electronic controller 202 determines that the occupant has vacated, and thus the restroom stall is available.

Figure 4:
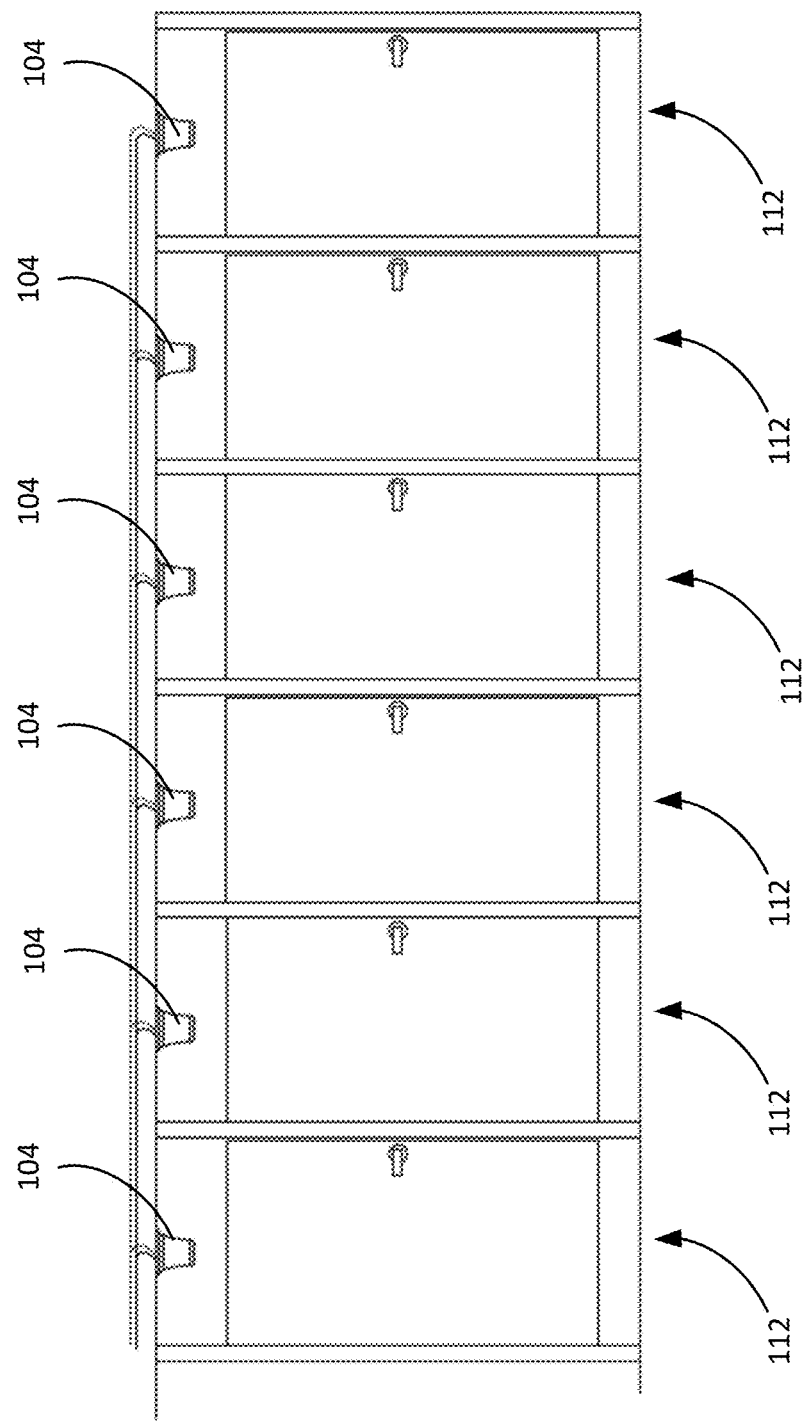
FIG. 4 is a side view of an example of availability indicators positioned within a facility according to some implementations.
Figure 5:
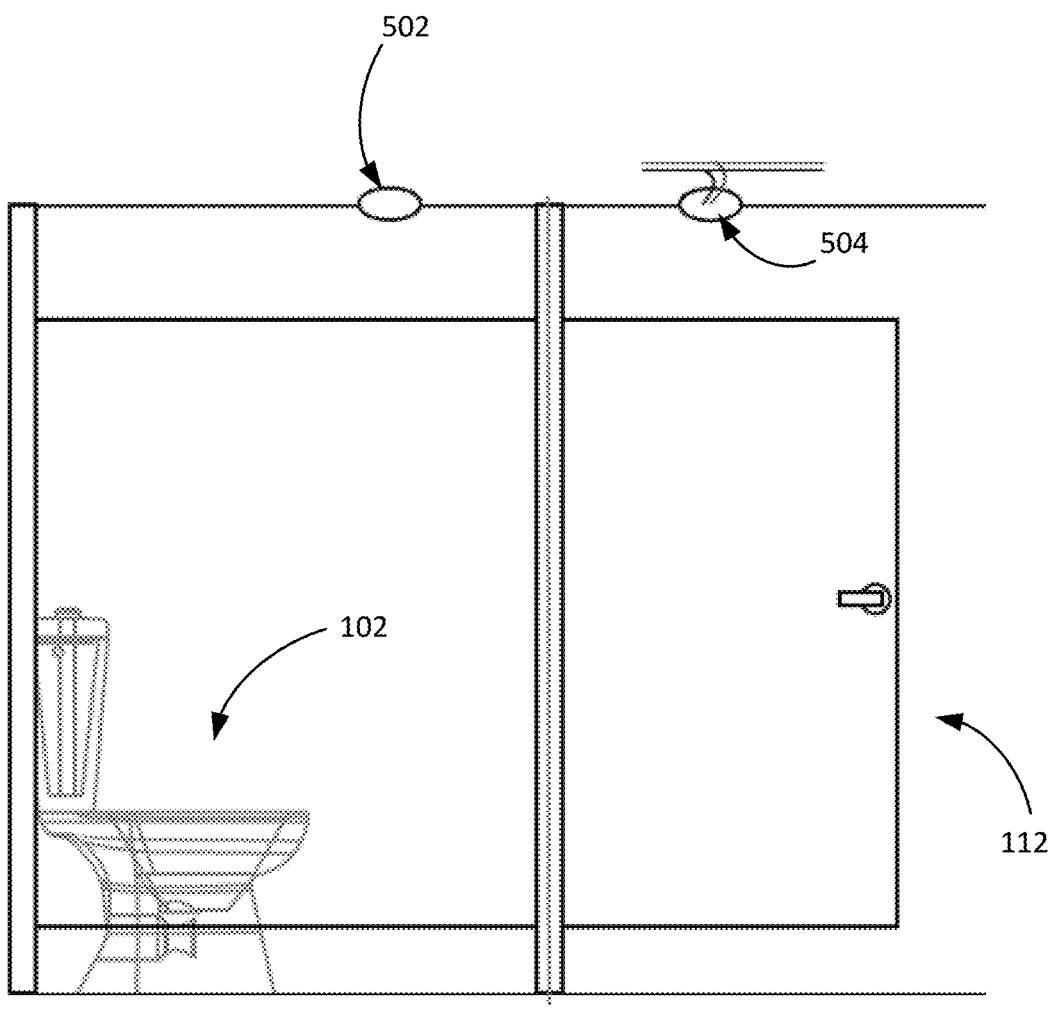
FIG. 5 is a side view of an example set of placement locations for the availability indicator of FIG. 2 according to some implementations.

In some implementations, the availability indicator 104 is positioned in a facility above a corresponding facility subsystem 112. Thus, the availability indicator 104 may be mounted to, for example, a ceiling of the facility, a wall of the facility, or another surface or device positioned above the corresponding facility subsystem 112. As one example, FIG. 4 illustrates an example of a set of availability indicators 104 mounted to a ceiling of a facility. In the example illustrated in FIG. 4, the availability indicators 104 are mounted such that each of the availability indicators 104 are outside a corresponding facility subsystem 112 (depicted as restroom stalls in FIG. 4). Alternatively, or in addition, in some implementations, the availability indicators 104 may be mounted inside a corresponding facility subsystem 112, as illustrated in FIG. 5. FIG. 5 illustrates a set of placement locations for the availability indicators 104 according to some implementations. As illustrated in FIG. 5, an availability indicator 104 may be positioned at a first placement location 502 located within the restroom stall (e.g., the facility subsystem 112). Alternatively, or in addition, an availability indicator 104 may be positioned at a second placement location 504 located outside the restroom stall (e.g., the facility subsystem 112).

In addition to determining an availability status, the electronic controller 202 may determine other conditions for the facility subsystem 112 based on sensor data collected by the thermal grid array sensor 212. For example, if a heat signature enters the outside region and then entryway region and then the outside region again, it could represent a potential maintenance issue with a fixture 102 (such as a broken or dirty toilet). Thus, in some implementations, the electronic controller 202 generates a maintenance alert signal responsive to the thermal grid array sensor 212 detecting a heat signature in the outside region and then in the entryway region and then in the outside region again. In some implementations, the electronic controller 202 sends the maintenance alert signal to one or more of the facility device 106, the user device 108, and the server 110. For example, the electronic controller 202 may send the maintenance alert signal to user devices 108 of maintenance personnel to inform them that the facility subsystem 112 requires service. Alternately, or in addition, in some implementations, the electronic controller 202 generates the maintenance alert signal by controlling the illumination indicator 208 to flash or otherwise display one or more specific colors. As one example, when the facility subsystem 112 is experiencing a maintenance issue (e.g., a clogged toilet), the illumination indicator 208 may flash a red color.

In some implementations, the thermal grid array sensor 212 is configured to measure a temperature of a facility (or a facility subsystem 112). Abnormally high temperature measurements can indicate potential hazardous situations such as a fire in the facility or if someone lights up a cigarette. Thus, in some implementations, the electronic controller 202 generates a temperature alert signal when a temperature measurement of the thermal grid array sensor 212 is greater than a predetermined threshold (e.g., greater than 500° F.). The electronic controller 202 may send the temperature alert signal to one or more of the facility device 106, the user device 108, and the server 110. For example, the electronic controller 202 may send the temperature alert signal to the user devices 108 of maintenance personnel to inform them of a potential situation in the facility. Alternately, or in addition, in some implementations, the electronic controller 202 generates the temperature alert signal by controlling the illumination indicator 208 to flash or otherwise display one or more specific colors. As one example, the illumination indicator 208 may flash an orange color to indicate a fire detected in the facility subsystem 112.

Returning to FIG. 1, the user device 108 and the server 110 are computing devices, such as a desktop computer, a laptop computer, a tablet computer, a terminal, a smart telephone, a smart television, a smart wearable, or another suitable computing device that interfaces with a user. Although not illustrated in FIG. 1, the facility device 106, the user device 108 and the server 110 may include similar components as the availability indicator 104, such as an electronic processor (e.g., a microprocessor, an ASIC, or another suitable electronic device), a memory (e.g., a non-transitory, computer-readable storage medium), a communication interface, such as a transceiver, for communicating over the communication network 114 and, optionally, one or more additional communication networks or connections, and one or more user interfaces.

In some implementations, the server 110 may include multiple electronic processors, multiple memory modules, multiple communication interfaces, or a combination thereof. Also, it should be understood that the functionality described herein as being performed by the server 110 may be performed in a distributed nature by a plurality of computers located in various geographic locations. For example, the functionality described herein as being performed by the server 110 may be performed by a plurality of computers included in a cloud computing environment.

The server 110 is configured to monitor and manage one or more facilities, including the fixtures 102 therein. In some implementations, the server 110 (via an electronic processor of the server 110) may receive sensor data, availability data, or a combination thereof from the facility device 106. In response to receiving the sensor data, availability data, or a combination thereof, the server 110 may process the sensor data, availability data, or a combination thereof in order to determine usage information or patterns associated with the one or more facilities, including the fixtures 102 thereof. The server 110 may store the usage information or patterns in, for example, a memory of the server 110. Alternatively, or in addition, the server 110 may transmit the usage information or patterns to a remote device for storage.

In some implementations, the electronic controller 202 is configured to a determine movement attribute of a heat signature based on the sensor data measured by the thermal grid array sensor 212. For example, the electronic controller 202 may determine speeds or velocities of heat signatures. As used herein in reference to a heat signature, the term "velocity" refers the speed of the heat signature in a given direction. In some implementations, the movement attributes of heat signatures are used to provide more accurate occupancy status information. In addition, the movement attributes of heat signatures can be used to track traffic flow patterns through a facility. For example, in a facility with multiple entrances, the movement attributes of heat signatures can be used to determine which side occupants typically enter from in order to infer which entrance of the facility is more popular.

A user may interact with and access data associated with one or more facilities, such as one or more of the fixtures 102 therein (e.g., the usage information or patterns determined by the server 110). The user device 108 may be used by an end user, such as a facility entity, to monitor and manage a facility, one or more fixtures 102 of a facility, or a combination thereof. For example, a user may access and interact with the data determined by the server 110 to view and understand usage patterns, which may allow a facility entity or maintainer insights into, for example, how to optimize cleaning and maintenance schedules, whether there is a need for additional facilities, availability indicators, or a combination thereof. For example, to communicate with the server 110 (i.e., the usage information or patterns determined by the server 110), the user device 108 may store a browser application or a dedicated software application executable by an electronic processor for interacting with the server 110.

Figure 6:
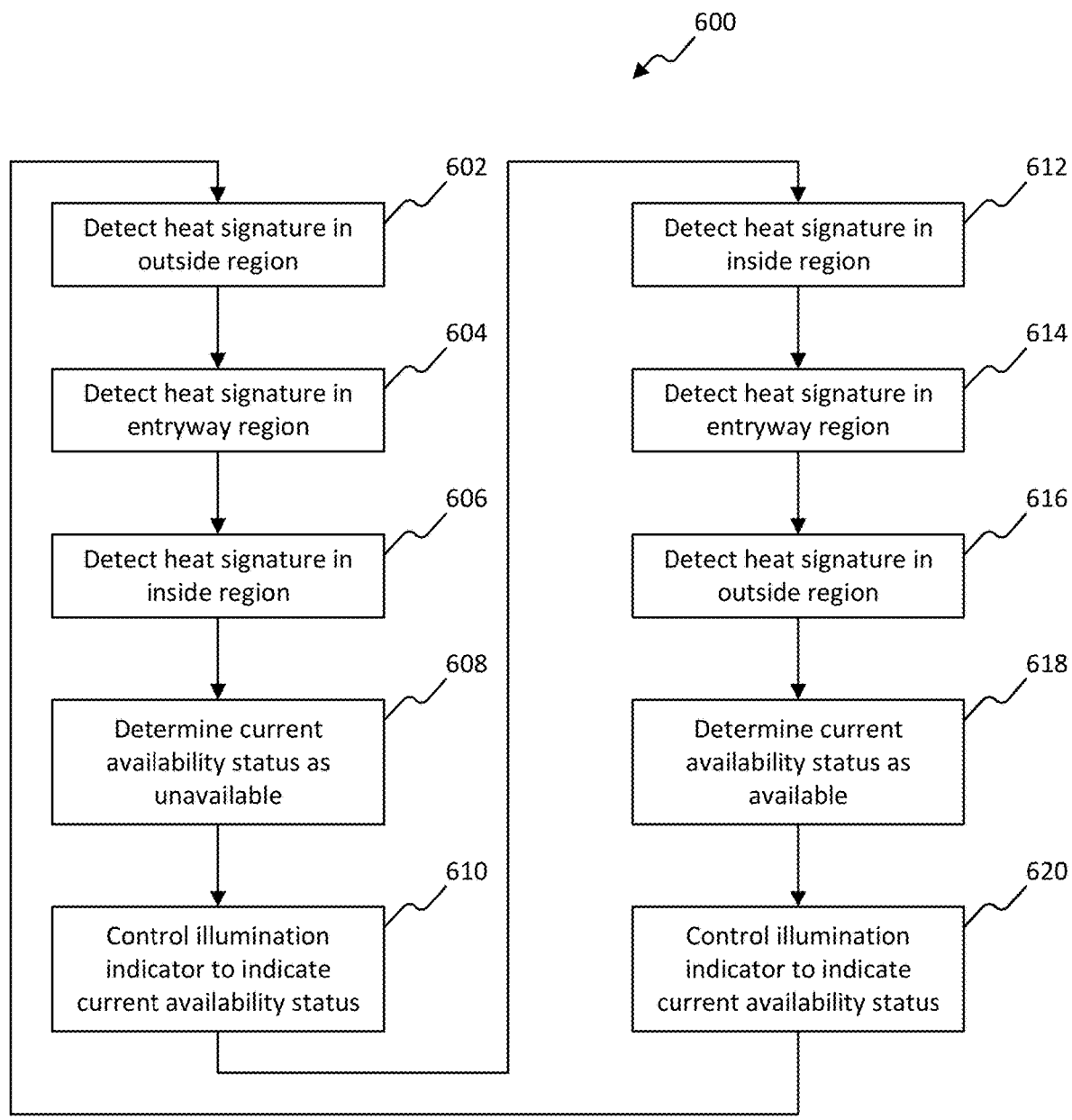
FIG. 6 is a flowchart of an example of a method for providing an availability status associated with a facility using the system of FIG. 1 according to some implementations.

FIG. 6 is a flowchart of an example of a method 600 for providing an availability status associated with a facility. The method 600 is described herein as being performed by the availability indicator 104 (the electronic controller 202 via the electronic processor 214 executing instructions). However, the functionality performed by the availability indicator 104 (or a portion thereof) may be performed by other devices, such as one or more other components of the system 100.

As illustrated in FIG. 6, the method 600 includes the thermal grid array sensor 212 detecting a heat signature in an outside region at block 602. For example, thermal sensor 220A may detect a heat signature in region 306 located right outside a bathroom stall as illustrated in FIG. 3. After detecting the heat signature in the outside region at block 602, the thermal grid array sensor 212 detects the heat signature in an entryway region at block 604. For example, thermal sensor 220B may detect the heat signature in region 308 located just inside the door of a bathroom stall as illustrated in FIG. 3. After detecting the heat signature in the entryway region at block 604, the thermal grid array sensor 212 detects the heat signature in an inside region at block 606. For example, thermal sensor 220C may detect the heat signature in region 310 located inside a bathroom stall near the fixture 102 (i.e., a toilet) as illustrated in FIG. 3.

Responsive to the above-described detections occurring in the above-described order, the electronic controller 202 determines the current availability status as unavailable at block 608. In some implementations, the method 600 returns to block 602 when the detections of blocks 602, 604, and 606 do not occur in the order described above. For example, the method 600 may return to block 602 when the thermal grid array sensor 212 detects a heat signature in the outside region and then the entryway region and then the outside region (potentially indicating that an occupant walked into the facility subsystem 112 but did not use it). Alternatively, or in addition, in some implementations, the method 600 returns to block 602 when the detections of blocks 602, 604, and 606 do not occur with a predetermined period of time. For example, the method 600 may return to block 602 when the thermal grid array sensor 212 detects a heat signature in the outside region and then does not detect the heat signature in the entryway region within 30 seconds (potentially indicating that an occupant passed by the facility subsystem 112 but did not enter).

After determining the current availability status as unavailable at block 608, the electronic controller 202 controls the illumination indicator 208 associated with the facility subsystem 112 to indicate the current availability status for the facility subsystem 112 at block 610. As noted above, the electronic controller 202 may control the illumination indicator 208 by generating and transmitting one or more control signals to the illumination indicator 208 based on the current availability status. The illumination indicator 208 may indicate the current availability status by visually displaying (or illuminating) various colored lights as an indication of the current availability status. Thus, in some implementations, the electronic controller 202 controls the illumination indicator 208 to display one or more specific colors based on the current availability status. The electronic controller 202 may control the illumination indicator 208 to display a first color when the current availability status is unavailable (at block 610) and a second color when the current availability status is available (at block 620), where the first color is different from the second color. As one example, the illumination indicator 208 may display a red light to indicate the availability status of "unavailable." As another example, the illumination indicator 208 may display a green light to indicate the availability status of "available."

After controlling the illumination indicator 208 at block 610, the thermal grid array sensor 212 detects the heat signature in the inside region at block 612. In some implementations, the detection at block 612 is the same detection as the one that occurs at block 606 (e.g., due to the occupant maintaining continuous presence in the inside region while using the fixture 102). In other implementations, the detection at block 612 is a different detection from the detection that occurs at block 606 (e.g., due to the occupant temporarily not being present in the inside region while using the fixture 102). After detecting the heat signature in the outside region at block 612, the thermal grid array sensor 212 detects the heat signature in the entryway region at block 614. After detecting the heat signature in the entryway region at block 614, the thermal grid array sensor 212 detects the heat signature in the outside region at block 616. Responsive to the above-described detections occurring in the above-described order, the electronic controller 202 determines the current availability status as available at block 618. In some implementations, the method 600 returns to block 612 when the detections of blocks 612, 614, and 616 do not occur in the order described above. For example, the method 600 may return to block 612 when the thermal grid array sensor 212 detects a heat signature in the inside region and then the entryway region and then the inside region again (e.g., potentially indicating that an occupant is moving within the facility subsystem 112 but has not yet exited).

After determining the current availability status as available at block 618, the electronic controller 202 controls the illumination indicator 208 associated with the facility subsystem 112 to indicate the current availability status for the facility subsystem 112 at block 620. For example, the electronic controller 202 may control the illumination indicator 208 by generating and transmitting one or more control signals to the illumination indicator 208 based on the current availability status as described above in relation to block 610. In some implementations, after block 620, the method 600 returns to block 602 to detect another heat signature in the outside region as illustrated in FIG. 6. In other implementations, the method 600 may end at block 620.

In some implementations, the electronic controller 202 transmits availability data associated with the facility subsystem 112 to a remote device, such as, for example, the facility device 106, the user device 108, the server 110, or the like. The availability data transmitted to the remote device may include, for example, the sensor data received by the electronic controller 202 from the thermal grid array sensor 212, the current availability status determined by the electronic controller 202 (at blocks 608 and 618), or a combination thereof.

Thus, in some implementations, the electronic controller 202 transmits the availability data for virtual or remote processing. The electronic controller 202 may transmit the data to the facility device 106 (as a gateway device). The facility device 106 may then forward the availability data to a remote device, server, or database for virtual processing in the cloud, such as, for example, the user device 108, the server 110, or a combination thereof. As one example, a user may use the user device 108 (or another remote device) to access and interact with the data. The user may view and interact with usage patterns, which may allow a facility entity or maintainer insights into, for example, how to optimize cleaning and maintenance schedules (for example, for preventative or predicted maintenance), whether there is a need for additional facilities, facility subsystems 112, or a combination thereof, and the like. As noted above, in some implementations, the server 110 is configured to monitoring and managing one or more facilities, including the fixtures 102 or facility subsystems 112 therein. In some implementations, the server 110 (via an electronic processor of the server 110) may receive availability data, sensor data, or a combination thereof from the facility device 106. In response to receiving the availability data, the sensor data, or a combination thereof, the server 110 may process the received data in order to determine usage information or patterns associated with the one or more facilities, including the facility subsystems 112 and/or fixtures 102 thereof.

In some implementations, the components of the availability indicator 104 are fully self-contained within a housing. For example, the electronic controller 202, the illumination indicator 208, the thermal grid array sensor, and other components, may be fully self-contained within a housing. Fully self-contained implementations of the availability indicator 104 are more reliable, easier to install, and easier to maintain when compared with other systems. For example, unlike other systems which require battery-powered sensors, the thermal grid array sensor 212 in the availability indicator 104 can be powered by mains power. As a further example, unlike other systems which use door latch sensors, the availability indicator 104 can be mounted on the ceiling near a facility subsystem 112. It is easier to mount a device to a ceiling than to retrofit a door to include a door latch sensor. Further, door latch sensors are prone to installation errors that can prevent the occupancy status from being correctly determined.

Figure 7:
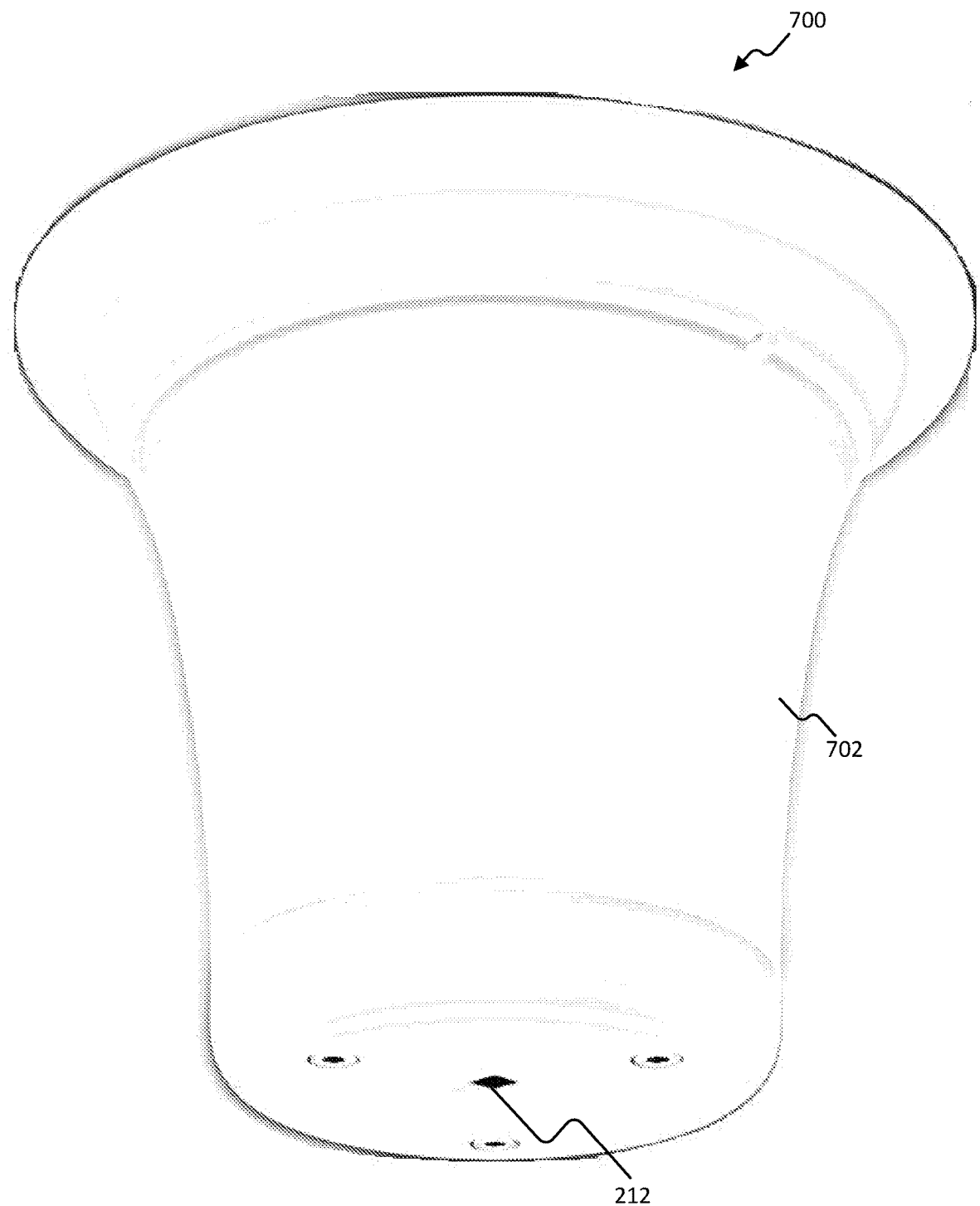
FIG. 7 is a perspective external view of an example of a housing for an available indicator included in the system of FIG. 1 according to some implementations.

FIG. 7 is a perspective external view of an example of a housing 700 for the availability indicator 104. The housing 700 illustrated in FIG. 7 includes, among other things, a translucent sidewall 702 that acts as a lens to direct emitted by the illumination indicator 208. The concave shape of the translucent sidewall 702 illustrated in FIG. 7 directs light emitted by the illumination indicator 208 in both axial and radial directions. Thus, light emitted by the illumination indicator 208 is visible to both people positioned on a side of the availability indicator 104 (e.g., a person determining whether the associated facility subsystem 112 is occupied) and a person positioned directly under the availability indicator 104 (e.g., a current occupant of the associated facility subsystem 112). Further, the translucent sidewall 702 does not block the thermal grid array sensor 212 as illustrated in FIG. 7.

Figure 8:
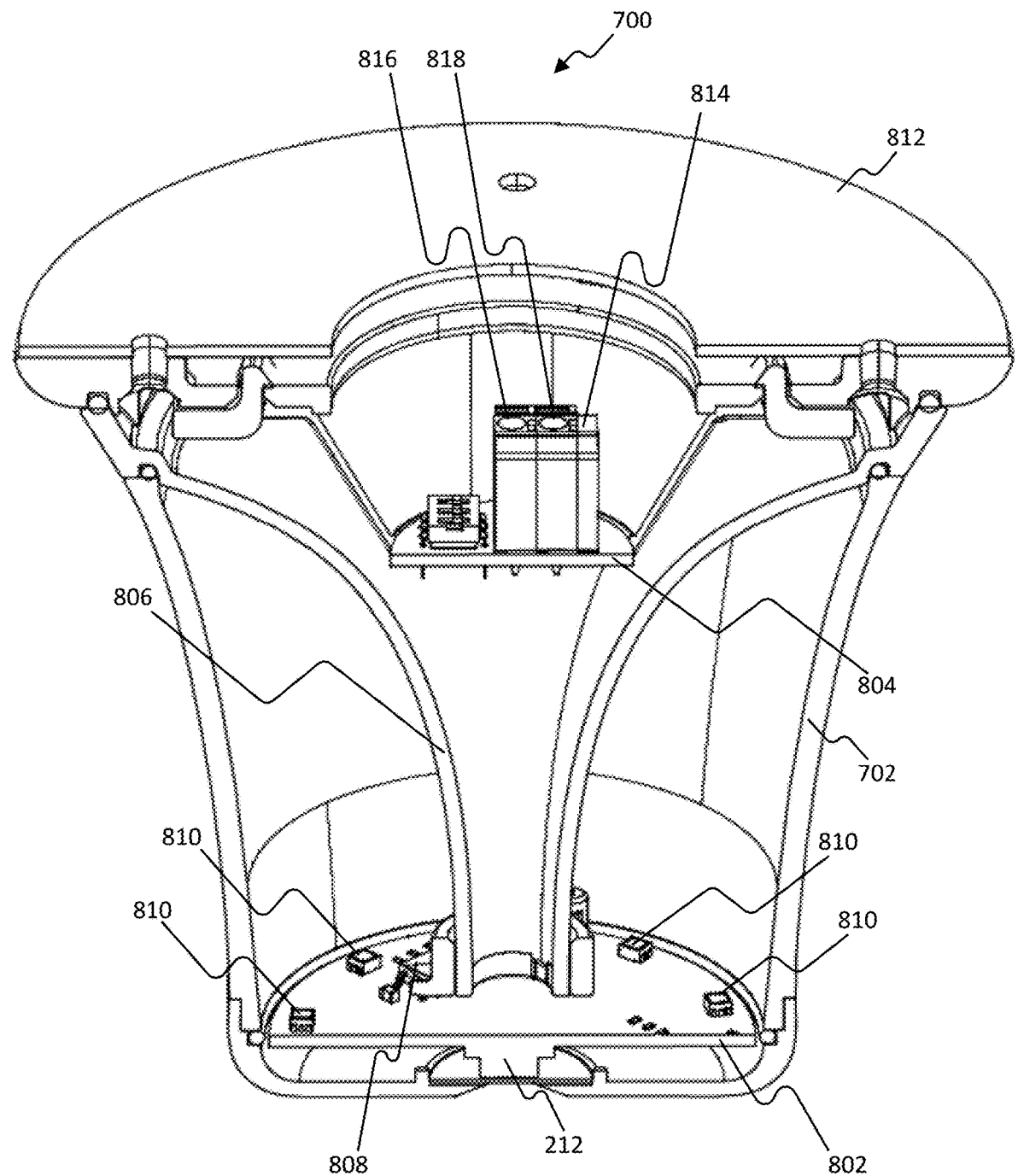
FIG. 8 is perspective sectional view of the housing of FIG. 7.

FIG. 8 is a perspective sectional view of the housing 700 for the availability indicator 104. The availability indicator 104 illustrated in FIG. 8 includes, among other things, a first circuit board 802, a second circuit board 804, and a reflector 806. The first circuit board 802 and the second circuit board 804 are electrically coupled by one or more wires (not shown). The thermal grid array sensor 212, an integrated circuit 808, a plurality of LEDs 810, and other components are coupled to the first circuit board 802. The integrated circuit 808 may include, for example, the electronic controller 202. The plurality of LEDs 810 act as the illumination indicator 208. The housing 700 includes a mounting surface 812 where the availability indicator 104 is mounted, for example, to a ceiling. The first circuit board 802 is positioned at an end of the housing 700 opposite the mounting surface 812 so that the thermal grid array sensor 212 has an unobstructed view. A power adapter 814 and other components are coupled to the second circuit board 804. The power adapter 814 includes connecters 816 and 818 for coupling to mains power. The second circuit board 804 is positioned proximate to the mounting surface 812 for ease of coupling the power adapter 814 to mains power which, among other things, simplifies installation. The reflector 806 is concave-shaped to reflect light emitted by the plurality of LEDs 810 toward the translucent sidewall 702 in both axial and radial directions.

Figure 9A:
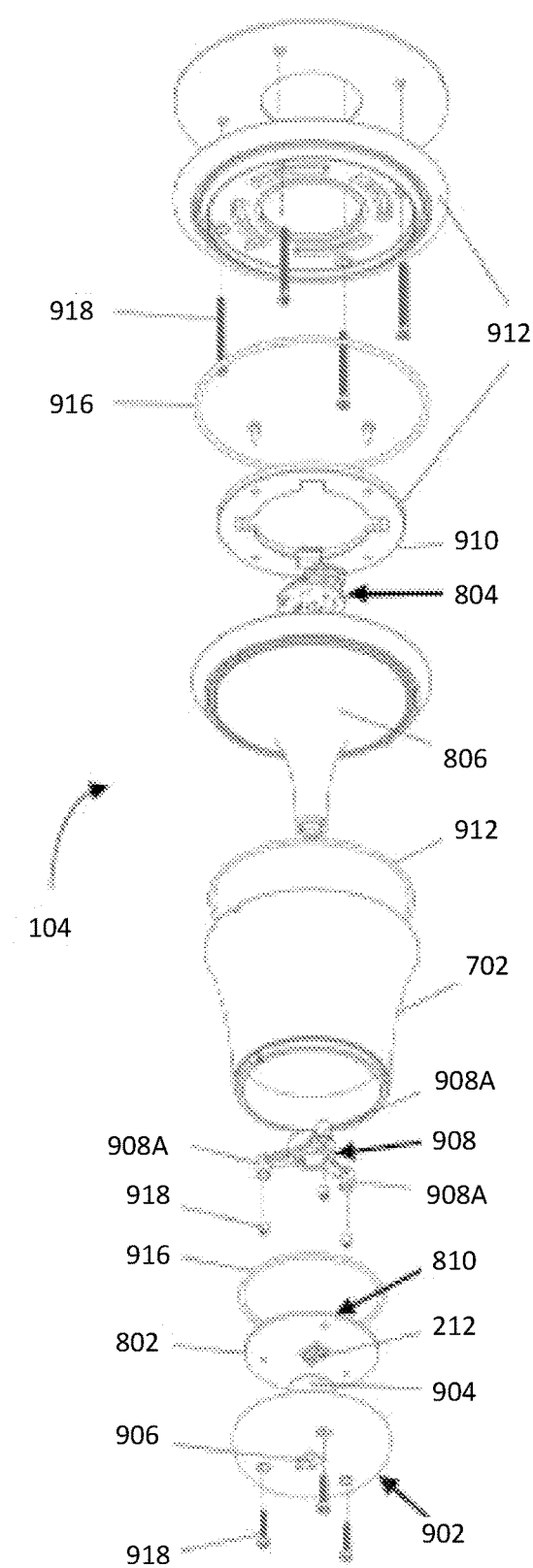
FIG. 9A is an exploded view of the availability indicator of FIG. 7, in accordance with some implementations.
Figure 9B:
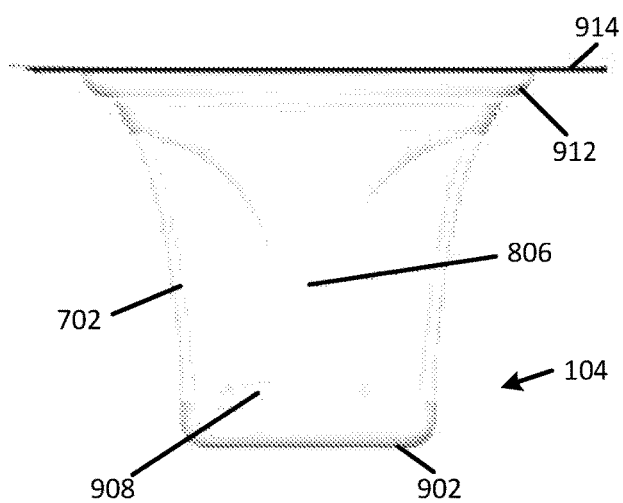
FIG. 9B is an assembled view of the availability indicator referenced in FIG. 7, in accordance with some implementations.

An example of an exploded (disassembled) representation of the availability indicator 104 is illustrated in FIG. 9A and an example of an assembled representation of the availability indicator 104 is illustrated in FIG. 9B. In the illustrated example, the availability indicator 104 has the appearance of a surface mounted lamp unit.

Referring to FIG. 9A, from bottom-up the availability indicator 104 includes a bottom end cap 902 (i.e., casing), which houses the first circuit board 802 (e.g., a printed circuit board) and the thermal grid array sensor 212 (e.g., an infrared array sensor Grid-EYE™ [by Panasonic]). The thermal grid array sensor 212 is arranged on an underside of the first circuit board 802 and is arranged to detect temperature change from a predetermined area below the thermal grid array sensor 212, where the temperature change is representative of a person moving through the viewing zone. In the illustrated example, a polyethylene lens 904 is located between the thermal grid array sensor 212 and the bottom end cap 902. The bottom end cap 902 includes a hole/opening 906 to ensure unimpaired visibility to the thermal grid array sensor 212 via the polyethylene lens 904.

Figure 9C:
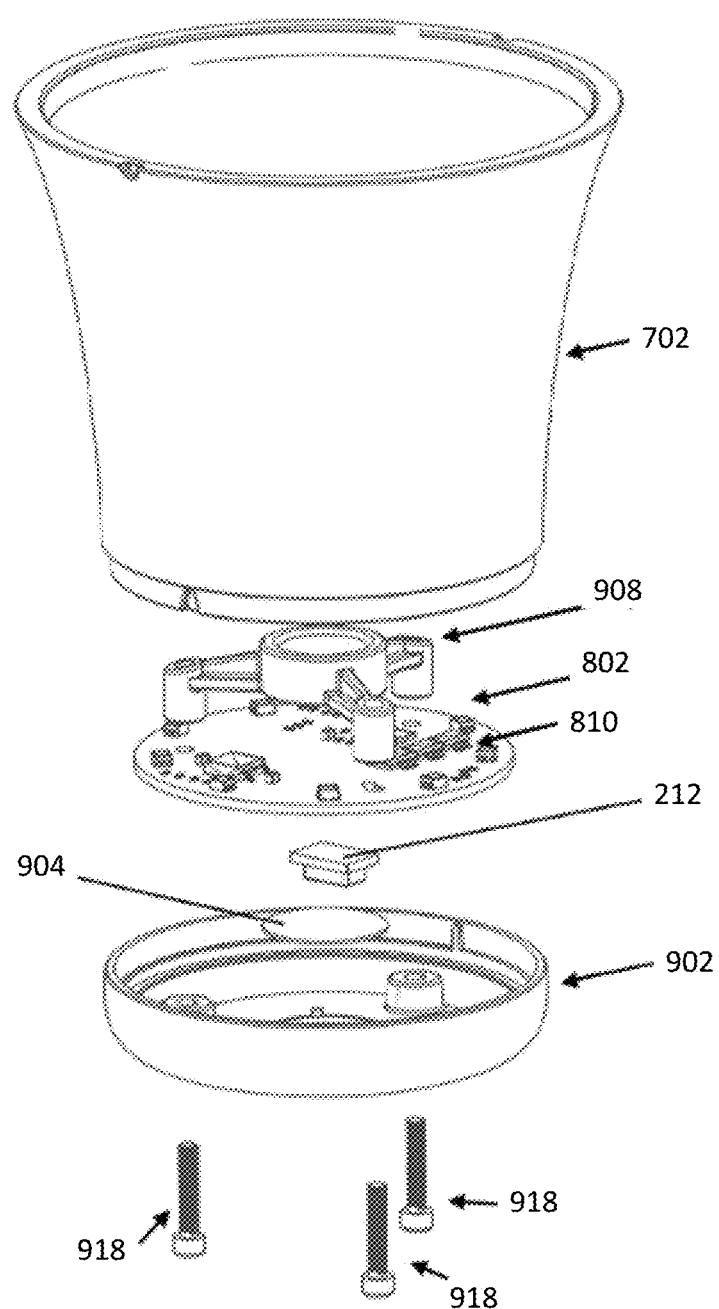
FIG. 9C is a close-up view of a circuit board and a thermal grid array sensor included in FIG. 9A, in accordance with some implementations.

The upper side of the first circuit board 802 (see FIG. 9C) includes a plurality of LEDs 810 (e.g., Tricolor PLCC6 Black Surface LEDs™), which are configured to illuminate in real-time one of three colors to indicate the availability status of the room, the facility, or the facility subsystem 112 in which the availability indicator 104 is mounted.

The three colors, for example red, green and blue, are each used to indicate a different availability status. Red illumination indicates the status as being busy/engaged and so informs the user not to enter the particular facility. Green illumination indicates the status as being free/vacant/available and so informs the user that the facility can be entered. The third color, for example blue, may be used to indicate downtime, for example maintenance/cleaning or out of order.

In the illustrated example, a spacer 908 (e.g., a three-pronged 908A spacer) is included to ensure no face-to-face contact between the face of the first circuit board 802 and the components above the first circuit board 802.

Referring to FIG. 9B, the availability indicator 104 includes the translucent sidewall 702 (an example of an "outer casing") and the reflector 806 (e.g., a light reflector), which are the components that visualise the illuminated colors (i.e., the visible aspect of the availability indicator 104 as seen by the user). In the illustrated example, the reflector 806 is in the form of a curved cone. The reflector 806 is operable to boost the illuminated color. The translucent sidewall 702 acts as a diffuser to diffuse/soften the illuminated colour. The translucent sidewall 702 envelops the reflector 806.

In the illustrated example (FIG. 9A), the availability indicator 104 also includes the second circuit board 804 (an example of a "power board connector"), which incorporates a dip switch 910. In the illustrated example, the second circuit board 804 powers the first circuit board 802 and the thermal grid array sensor 212; the dip switch 910 is a zone controller because it facilitates selecting/manipulating the field of view of the thermal grid array sensor 212 by switching on and off pixels thereby controlling the detecting zones (or regions) (see FIGS. 3A and 3B).

As discussed above, the thermal grid array sensor 212, as a feature of the availability indicator 104, can be configured such that the viewing angle/viewing zones is adjusted/controlled to suit the facility/application in which the availability indicator 104 is deployed. The dip switch 910 facilitates the configuration of the field of view of the thermal grid array sensor 212 by selecting banks of pixels A1 to H8 to suit the facility subsystem 112 in which the availability indicator 104 is deployed and the viewing requirements of the facility subsystem 112.

In the illustrated example, the dip switch 910 is configured as a manual switch, which permits, in advance of installation, adjustment of the thermal grid array sensor 212 i.e. the selection of pixels A1 to H8, which need to be switched on and off to characterise the extent of the viewing field i.e. adapt the viewing field to suit the size of the facility subsystem 112 above which the availability indicator 104 is installed. Pre-selecting the zones, through which a user must pass to use the facility subsystem 112, ensures that each user must pass through the selected zones (e.g., regions 306, 308, and 310 as illustrated in FIGS. 3A and 3B). Tailoring the field of view to suit the facility subsystem 112 ensures that the thermal grid array sensor 212 cannot be evaded by a user attempting to pass around the perimeter of the viewing field.

The example described above utilises a manual implementation of the dip switch 910. However, it should be appreciated the dip switch 910 may be remotely controlled such that the field of view can be adapted prior to and after installation such that the field of view can be tailored in real time to ensure that the boundary of the viewing field is adapted to the boundary of the facility subsystem 112.

The thermal grid array sensor 212 (e.g., Grid-EYE®) is a compact unit using MEMS thermopile technology and features 64 thermopile elements in an 8×8 grid format and a 64-pixel infrared camera. The thermal grid array sensor 212 offers digital output (e.g., I2C) for thermal presence, direction, and temperature values. It includes a built-in silicon lens, which includes a 60-degree viewing angle. The thermal grid array sensor 212 can identify the direction of movement of people and objects and can also detect position, presence and actual surface temperatures from −20° C. to +100° C. The polyethylene lens 904 in the bottom end cap 902 protects the thermal grid array sensor 212 and its silicon lens.

The availability indicator 104 as noted above is configured to be ceiling mounted i.e. the reflector 806 and the translucent sidewall 702 extend down from a ceiling mount plate 912 which facilitate fixing the availability indicator 104 to the ceiling 914.

Figure 10A:
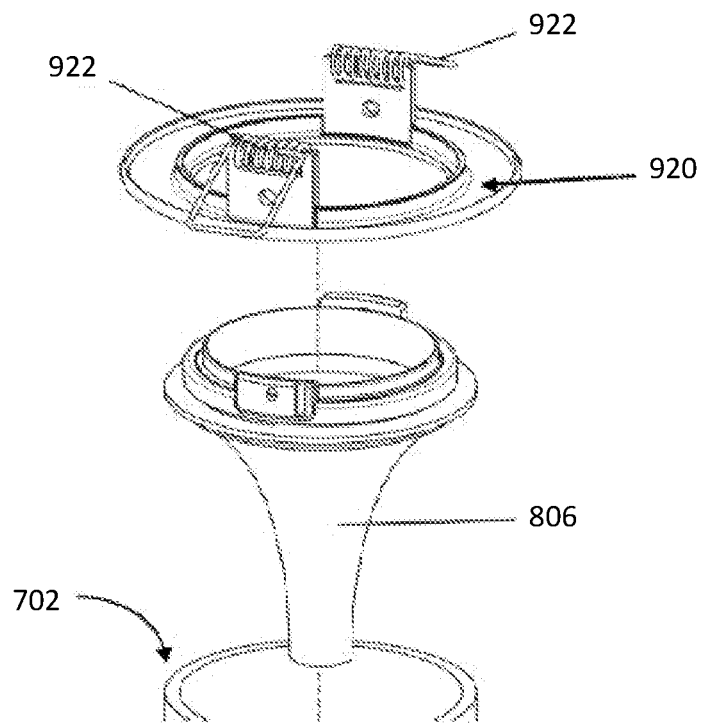
FIG. 10A is a diagram of a first example of a fixing to fix the availability indicator of FIG. 9B to a ceiling, in accordance with some implementations.

The availability indicator 104, as illustrated in FIG. 10A includes seals 916, for example O-ring seals at each joint/interface at the bottom end cap 902, translucent sidewall 702, reflector 806, ceiling mount plate 912 and between the ceiling mount plate 912 and the exposed surface of the ceiling 914. Sealing each joint ensures the availability indicator 104 is leakproof/watertight. It will be appreciated, when the availability indicator 104 is used in an environment such as a washroom, lavatory etc. it may be exposed to high levels of humidity from time to time and therefore it is important that the internal components and internal surfaces are protected against humidity.

Fasteners 918 e.g. screws and fixings 920 (see FIGS. 9A and 9C) complete the assembly of the availability indicator 104.

FIG. 10A illustrates a first example of a fixing 920, which facilitates fixing the availability indicator 104 to a ceiling (not visible). The fixing 920 includes retaining springs 922, where the springs 922 are configured to fit through a hole in the ceiling e.g. a ceiling tile, plasterboard etc and to grip a rear face of the ceiling such that the availability indicator 104 is retained tightly against the exposed/exterior surface of the ceiling 914.

Figure 10B:
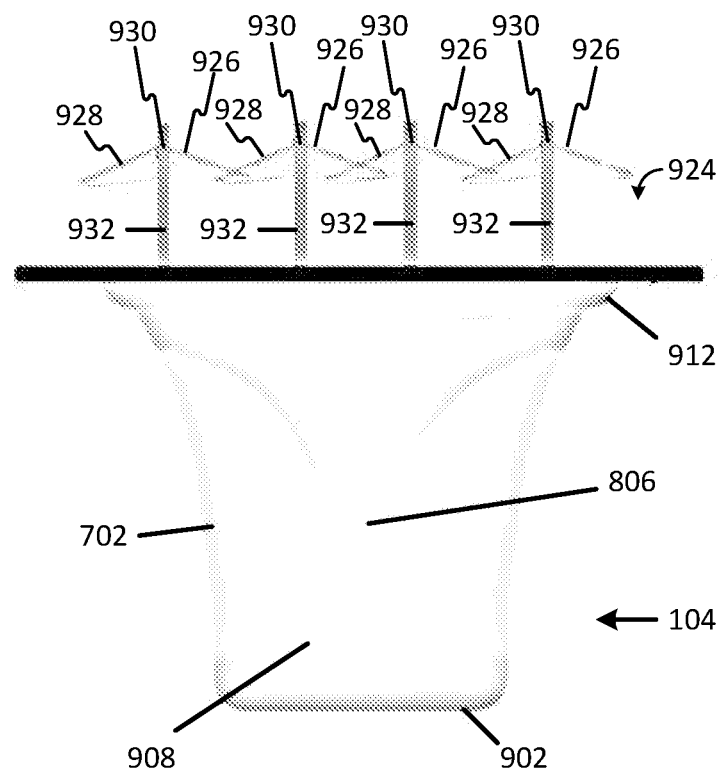
FIG. 10B is a diagram of a second example of a fixing to connect the availability indicator of FIG. 9B to a ceiling, in accordance with some implementations.

A further example of a fixing 924 utilises a spring toggle fixing 926 (see FIG. 10B). The illustrated example uses four toggle fixings 926. Each toggle fixing 926 comprises two spring-loaded arms 928 with a thread tapped into the hinge pivot 930. A screw 932 is engaged with the thread in the hinge pivot 930. For installation, the two arms 928 are held against the screw 932 as the fixing 924 is inserted through a pre-drilled hole through the ceiling 914. Once the arms 928 are fully inserted (as shown in FIG. 10B) they extend outwards under a spring force such that when the screws 932 are tightened the surface of each arm 928 is tightened against the reverse side of the tile or board through which the toggle fixing 926 is inserted.

The example described above relates to a single application of a single availability indicator 104 (i.e. in a lavatory cubicle 300).

Figure 11:
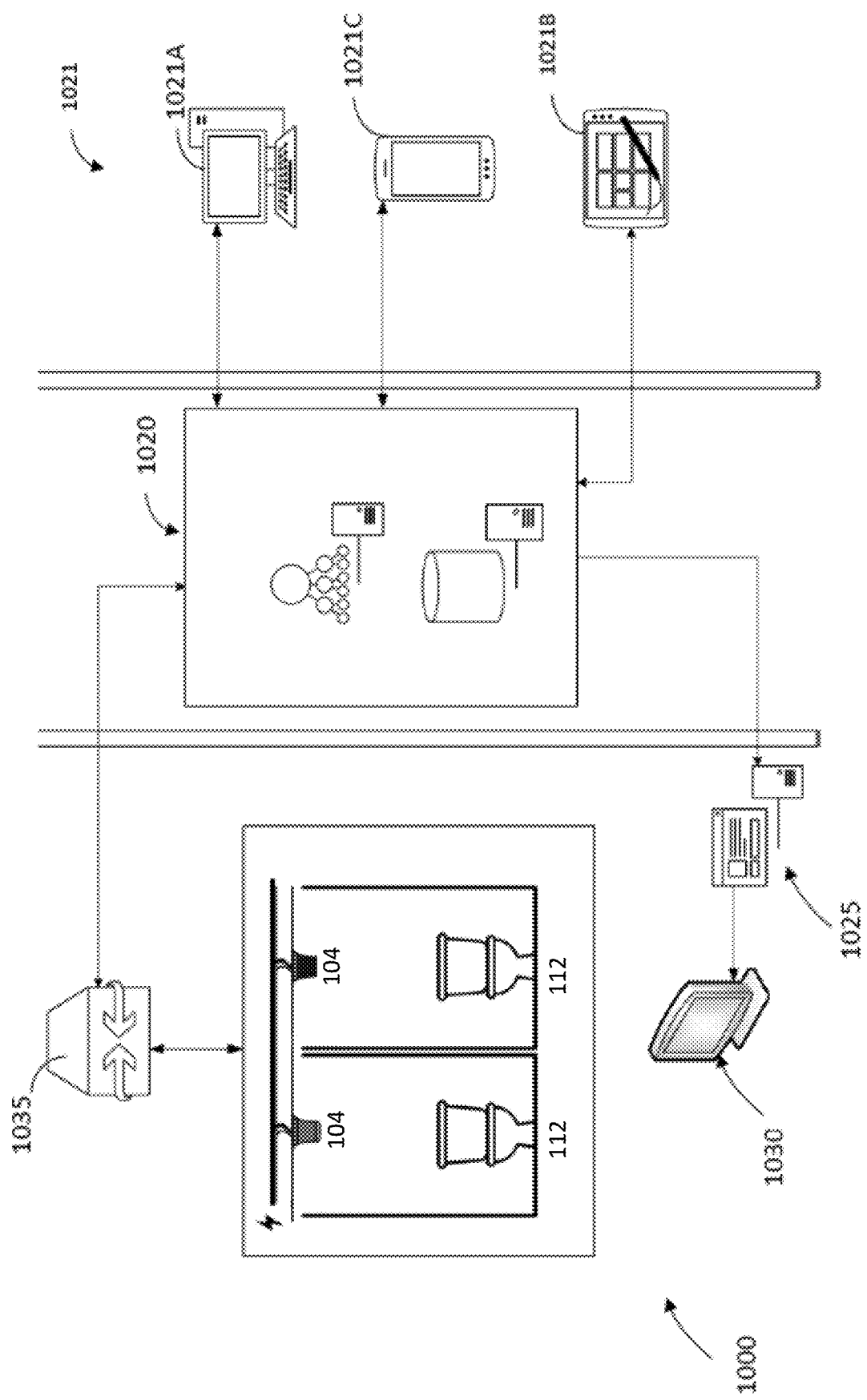
FIG. 11 is a diagram of an example of a system including multiple availability indicators, in accordance with some implementations.

The present disclosure also relates to a visual indication system 1000, which is illustrated schematically in FIG. 11. In a similar setting to that described above the visual indication system 1000 may relate to deployment of a plurality of availability indicators 104 in a washroom/restroom facility, for example, in an airport washroom where each lavatory cubicle 300 or urinal booth (not illustrated) represents a sub-facility and each sub-facility is equipped with an availability indicator 104 such that availability of each sub-facility i.e. lavatory cubicle/urinal booth in the facility is readily indicated by the illumination of each availability indicator 104 (e.g., red, green, or blue). In the illustrated example two colors, red and green are represented by contrasting greyscale.

In addition to each facility subsystem 112 including an availability indicator 104, an entrance (not illustrated) to the facility may also include an availability indicator 104, such that the facility is equipped to constantly detect users passing over the threshold of the facility. Therefore, real-time analysis of users can be captured such that an occupancy count or level of users entering the facility at any point in time may be detected.

FIG. 11 illustrates schematically a visual indication system 1000, which incorporates more than one availability indicator 104, one or more electronic processors and one or more communication interfaces.

In the illustrated example, the visual indication system 1000 includes a cellular gateway 1035, which connects the local network in which the availability indicators 104 are located and the cloud network 1020, where the captured information can be stored, retrieved and transmitted. The visual indication system 1000 also includes various means of displaying information about the status of the one or more facilities/sub-facilities monitored by the visual indication system 1000.

The visual indication system 1000 is configured such that each availability indicator 104 is capable of being IoT enabled, i.e. can collect real time data and delivering the real time data to a facilities management system 1021 such that usage and possible faults are easily identified.

The real time information may also be accessible via electronic devices such as mobile device 1021B or electronic display interfaces 1021C, which, for example, utilise a mobile application, which refreshes in real time to display accurate information about availability of the sub-facility and facility being monitored. Example electronic device 1021A and mobile device 1021B may include graphical user interface/dashboard via which a user can see the availability status of a facility or sub facility remotely. This is particularly useful in venues that may include several facilities because the user can select the facility that meets their requirements and location in the venue. The GUI/dashboard may be available via a mobile application as indicated by 1021C in FIG. 11. The GUI/dashboard may be interactive for certain users and purposes e.g. for facilities management/maintenance.

In the example described above i.e. a washroom/restroom facility, each availability indicator 104 records in real time actual cubicle (sub-facility) usage and therefore is a valuable tool in communicating and determining when the overall facility is busiest and quietest, identifying which cubicle or cubicles (sub-facility) is/are used most often i.e. identifying if particular cubicles/sub-facilities are favoured more than others.

In addition, each availability indicator 104 can be connected to a facility device e.g. an occupancy display, which may be located at the facility entrance or in various locations through the venue in which the facility is located. The occupancy display device 1030 facilitates visual identification of which cubicles/sub-facilities, within the facility, are engaged/unavailable and which are available.

The visual indication system 1000 may include an override facility, wherein the illumination of any availability indicator 104 can be overridden and the colour presented e.g. blue relates to neither vacant nor engaged, but instead the colour indicates a sub-facility as being unavailable (e.g., "out of order") under maintenance or to restrict usage to ensure physical distancing is maintained between users. The override facility may be controlled from a remotely operated device/management interface.

The visual indication system 1000 facilitates communication between each availability indicator 104 and other devices e.g. an occupancy application server 1025, an occupancy display device 1030, a cloud-based server and databases 1020 etc.

The availability indicator 104 may include a port for receiving a wired connection to an external device and/or a transceiver for establishing a wireless connection to an external device. The port facilitates localised transfer of data, information, updates, changing the selection of functional pixels etc. such that the availability indicator 104 operates in a predetermined manner. The transceiver facilitates remote transfer of data, remote transfer of information, remotely installing updates to the system, remotely changing the selection of functional pixels etc. to ensure efficient functioning and control of each availability indicator 104 and of the whole visual indication system 1000.

Each availability indicator 104 is configured to work independently of other availability indicators 104. Therefore, sensor overlap between availability indicators 104 is not an issue. As such the "viewing" zones of each availability indicator 104 may be selected to extend to beyond the physical boundary of a facility being monitored such that the sensor zones associated with each availability indicator 104 and its associated array sensor cannot be evaded by the user.

An application of the availability indicator 104 and the associated visual indication system 1000 are described above in relation to connected washrooms, which typically include lavatory cubicles, urinal booths and sometimes shower facilities. Venues such as sports stadia, cinemas, shopping centres, train stations, airports, convention centres, schools, colleges, universities, concert halls, theatres, public facilities and motorway service stations could benefit from such a visual indication system 1000 because some venues have multiple washroom/restrooms and a visual indication system 1000 as described above can provide information to the users about the capacity of each washroom at a glance and therefore avoids or at least reduces the occurrence of queues inside and outside facilities, where other facilities are available.

Further suitable applications of the availability indicator 104 and the associated visual indication system 1000 relate to occupancy and monitoring the number of occupants entering or leaving a venue/room e.g. conference rooms, meeting rooms etc. The visual indication system 1000 can be configured such that a predetermined number of occupants can enter a room. As such illumination of the availability indicator 104 can display a green light until the maximum number of occupants have entered the room. It will be appreciated the system can detect occupants leaving the room also. As such the visual indication system 1000 and the associated availability indicator 104 can be configured to recognise/monitor people arriving and leaving the venue such that the availability indicator 104 accurately reflects availability of the room in real time.

Image sensors (e.g., video cameras) may be used for occupancy detection. However, occupants may be uncomfortable with the use of image sensors in sensitive facilities such as bathrooms. Further, even in non-sensitive facilities, the use of optical sensors can present privacy concern issues. Unlike image sensors which capture image data, thermal sensors (such as those included in the thermal grid array sensor 212) capture heat data. The use of thermal sensors for occupancy detection as described herein provide accurate detection and alleviates the potential privacy concerns raised by using image sensors. However, in some rare implementations, the availability indicator 104 may include a grid array of image sensors instead of a grid array of thermal sensors.

The present disclosure further comprises the following numbered clauses.

CLAUSE (1) A system for providing an availability status associated with a facility, the system comprising: an illumination indicator associated with a facility subsystem of the facility; a thermal grid array sensor configured to sense: an outside region located outside of the facility subsystem, an entryway region located in an entryway of the facility subsystem, and an inside region located inside of the facility subsystem; and an electronic controller communicatively coupled to the illumination indicator and the thermal grid array sensor, the electronic controller configured to: determine a current availability status associated with the facility subsystem as unavailable responsive to the thermal grid array sensor: detecting a heat signature in the outside region, subsequently detecting the heat signature in the entryway region, and subsequently detecting the heat signature in the inside region, determine the current availability status associated with the facility subsystem as available responsive to the thermal grid array sensor: detecting the heat signature in the inside region, subsequently detecting the heat signature in the entryway region, and subsequently detecting the heat signature in the outside region, and control the illumination indicator to indicate the current availability status associated with the facility subsystem.

CLAUSE (2) The system of CLAUSE (1), wherein the electronic controller is further configured to generate a maintenance alert signal responsive to the thermal grid array sensor: detecting the heat signature in the outside region, subsequently detecting the heat signature in the entryway region, and subsequently detecting the heat signature in the outside region.

CLAUSE (3) The system of CLAUSE (1), wherein, to control the illumination indicator to indicate the current availability status, the electronic controller is further configured to: control the illumination indicator to display a first color when the current availability status is unavailable, and control the illumination indicator to display a second color when the current availability status is available, wherein the first color is different from the second color.

CLAUSE (4) The system of CLAUSE (1), wherein the outside region, the entryway region, and the inside region are arranged along a substantially-straight line.

CLAUSE (5) The system of CLAUSE (1), wherein the thermal grid array sensor including a plurality of infrared sensors.

CLAUSE (6) The system of CLAUSE (1), wherein the electronic controller is further configured to determine a movement attribute of the heat signature based on sensor data from the thermal grid array sensor, wherein the movement attribute of the heat signature including at least one of a speed or a velocity.

CLAUSE (7) The system of CLAUSE (1), wherein the thermal grid array sensor is further configured to measure a temperature of the facility, and wherein the electronic controller is further configured to generate a temperature alert signal when the temperature of the facility is greater than a predetermined threshold.

CLAUSE (8) A method for providing an availability status associated with a facility, the method comprising: determining, with an electronic controller, a current availability status associated with a facility subsystem of the facility as unavailable responsive to a thermal grid array sensor: detecting a heat signature in an outside region located outside of the facility subsystem, subsequently detecting the heat signature in an entryway region located in an entryway of the facility subsystem, and subsequently detecting the heat signature in an inside region located inside of the facility subsystem; determining, with the electronic controller, the current availability status associated with the facility subsystem as available responsive to the thermal grid array sensor: detecting the heat signature in the inside region, subsequently detecting the heat signature in the entryway, and subsequently detecting the heat signature in the outside region; and controlling, with the electronic controller, an illumination indicator associated with the facility subsystem to indicate the current availability status associated with the facility subsystem.

CLAUSE (9) The method of CLAUSE (8), further comprising generating, with the electronic controller, a maintenance alert signal responsive to the thermal grid array sensor: detecting the heat signature in the outside region, subsequently detecting the heat signature in the entryway region, and subsequently detecting the heat signature in the outside region.

CLAUSE (10) The method of CLAUSE (8), wherein controlling the illumination indicator to indicate the current availability status further including: controlling the illumination indicator to display a first color when the current availability status is unavailable, and controlling the illumination indicator to display a second color when the current availability status is available, wherein the first color is different from the second color.

CLAUSE (11) The method of CLAUSE (8), further comprising determining, with the electronic controller, a movement attribute of the heat signature based on sensor data from the thermal grid array sensor, wherein the movement attribute of the heat signature including at least one of a speed or a velocity.

CLAUSE (12) The method of CLAUSE (8), further comprising: measuring, with the thermal grid array sensor, a temperature of the facility; and generating, with the electronic controller, a temperature alert signal when the temperature of the facility is greater than a predetermined threshold.

CLAUSE (13) An apparatus for providing an availability status associated with a facility, the apparatus comprising: an illumination indicator associated with a facility subsystem of the facility; a thermal grid array sensor configured to sense: an outside region located outside of the facility subsystem, an entryway region located in an entryway of the facility subsystem, and an inside region located inside of the facility subsystem; and an electronic controller communicatively coupled to the illumination indicator and the thermal grid array sensor, the electronic controller configured to: determine a current availability status associated with the facility subsystem as unavailable responsive to the thermal grid array sensor: detecting a heat signature in the outside region, subsequently detecting the heat signature in the entryway region, and subsequently detecting the heat signature in the inside region, determine the current availability status associated with the facility subsystem as available responsive to the thermal grid array sensor: detecting the heat signature in the inside region, subsequently detecting the heat signature in the entryway region, and subsequently detecting the heat signature in the outside region, and control the illumination indicator to indicate the current availability status associated with the facility subsystem.

CLAUSE (14) The apparatus of CLAUSE (13), wherein the illumination indicator, the thermal grid array sensor, and the electronic controller are fully self-contained within a housing.

CLAUSE (15) The apparatus of CLAUSE (14), wherein the housing includes a translucent sidewall, wherein the translucent sidewall is concave-shaped for directing light emitted by the illumination indicator in at least one axial direction and in at least one radial direction.

CLAUSE (16) The apparatus of CLAUSE (13), wherein the electronic controller is further configured to generate a maintenance alert signal responsive to the thermal grid array sensor: detecting the heat signature in the outside region, subsequently detecting the heat signature in the entryway region, and subsequently detecting the heat signature in the outside region.

CLAUSE (17) The apparatus of CLAUSE (13), wherein, to control the illumination indicator to indicate the current availability status, the electronic controller is further configured to: control the illumination indicator to display a first color when the current availability status is unavailable, and control the illumination indicator to display a second color when the current availability status is available, wherein the first color is different from the second color.

CLAUSE (18) The apparatus of CLAUSE (13), wherein the outside region, the entryway region, and the inside region are disposed along a generally-linear path.

CLAUSE (19) The apparatus of CLAUSE (13), wherein the thermal grid array sensor including a plurality of infrared sensors.

CLAUSE (20) The apparatus of (13), wherein the electronic controller is further configured to determine a movement attribute of the heat signature based on sensor data from the thermal grid array sensor, wherein the movement attribute of the heat signature including at least one of a speed or a velocity.

CLAUSE (21) A visual indicator operable to indicate locally an availability status of a facility, the visual indicator comprises: a housing containing at least one illumination unit operable to display at least two separate illumination colours, where each colour represents a different availability status of the facility to which the visual indicator is associated; an infrared sensor unit, which is configured to detect motion of a person entering and leaving the facility, wherein the sensor is operable to detect heat (infrared rays) of the person passing through predetermined detection zones; a zone controller, which is operable to configure the detection zones according to a layout and confines of the facility, such that a person cannot evade the infrared sensor unit.

CLAUSE (22) A visual indicator as disclosed in CLAUSE (21), wherein the zone controller includes a switch member, which is configured to activate and deactivate zones associated with a field of view of the infrared sensor thereby configuring the detection zones.

CLAUSE (23) A visual indicator as disclosed in CLAUSE (22), wherein the switch is configured for manual adjustment prior to installation of the visual indicator.

CLAUSE (24) A visual indicator as disclosed in CLAUSE (22), wherein the switch is configured for remote adjustment prior to, during or post installation of the visual indicator.

CLAUSE (25) A visual indicator as disclosed in any one of CLAUSE (21) to CLAUSE (24), wherein the illumination unit includes a light reflector which is operable to boost the illuminated colour.

CLAUSE (26) A visual indicator as disclosed in CLAUSE (25), wherein the light reflector is defined by a conical member.

CLAUSE (27) A visual indicator as disclosed in CLAUSE (25) or CLAUSE (26), further comprising a diffuser, which is operable to dim the illuminated colour, wherein the diffuser envelops the light reflector.

CLAUSE (28) A visual indicator as disclosed in any one of CLAUSE (21) to CLAUSE (27), further comprising a fixing configured to attach the visual indicator to a surface in an elevated position.

CLAUSE (29) A visual indicator as disclosed in any one of CLAUSE (21) to CLAUSE (28), further comprising a fixing configured to attach the visual indicator to an exposed surface, which encloses a cavity behind the surface.

CLAUSE (30) A visual indicator as disclosed in CLAUSE (29), wherein the fixing comprises at least two retaining springs, wherein, in use the springs are located within the cavity and retain the visual indicator against the exposed surface.

CLAUSE (31) A visual indicator as disclosed in CLAUSE (29), wherein the fixing includes a plurality of toggle fixings, wherein, in use, the toggle fixings are located within the cavity and retain the visual indicator against the exposed surface.

CLAUSE (32) A visual indication system comprising a plurality of visual indicators as disclosed in any one of CLAUSE (21) to CLAUSE (31), a controller communicatively coupled to each visual indicator and a remote display unit, wherein the controller is configured to receive data from each sensor, determine a real-time availability status based on the data received from each sensor, control illumination of each illumination unit to indicate locally the real-time availability status of each visual indicator and to transmit to the remote display unit the status of each visual indicator such that the status of each visual indicator can be displayed remotely via the remote display unit.

CLAUSE (33) A visual indication system as disclosed in CLAUSE (32), wherein the controller is configured to control each visual indicator to display a first colour when the real time availability status is unavailable and a second colour when the real time availability status is available, wherein the first colour is different from the second colour.

CLAUSE (34) A visual indication system as disclosed in CLAUSE (33), wherein the controller is configured to override one or more visual indicators to display a third colour when the real time availability is suspended thereby indicating the status of the one or more visual indicator as inaccessible.

CLAUSE (35) A visual indication system as disclosed in CLAUSE (33), wherein the fixing includes a plurality of toggle fixings, wherein, in use, the toggle fixings are located within the cavity and retain the visual indicator against the exposed surface.

CLAUSE (36) A visual indication system comprising: a plurality of visual indicators as disclosed in any one of CLAUSE (21) to CLAUSE (35); a controller communicatively coupled to each visual indicator; and a remote display unit, wherein the controller is configured to receive data from each sensor, determine a real-time availability status based on the data received from each sensor, control illumination of each illumination unit to indicate locally the real-time availability status of each visual indicator and to transmit to the remote display unit the status of each visual indicator such that the status of each visual indicator can be displayed remotely via the remote display unit.

CLAUSE (37) A visual indication system as disclosed in CLAUSE (36), wherein the controller is configured to control each visual indicator to display a first colour when the real time availability status is unavailable and a second colour when the real time availability status is available, wherein the first colour is different from the second colour.

CLAUSE (38) A visual indication system as disclosed in CLAUSE (37), wherein the controller is configured to override one or more visual indicators to display a third colour when the real time availability is suspended thereby indicating the status of the one or more visual indicator as inaccessible.

Various features and advantages of present disclosure are set forth in the following claims.

What is claimed is:

1. A visual indicator operable to indicate locally an availability status associated with a facility, the visual indicator comprising:
a housing comprising an illumination unit operable to display at least two separate illumination colors indicting the availability status associated with the facility;
an infrared sensor unit configured to detect a heat signature of a person passing through a plurality of detection zones configured for the facility; and
a controller coupled to the illumination unit and infrared sensor unit and configured to:
receive sensor data from the infrared sensor unit;
process the sensor data to determine the availability status based on the heat signature passing through each of the detection zones, wherein the availability status is determined as unavailable by:
detecting the heat signature in a first zone of the detection zones,
subsequently detecting the heat signature in a second zone of the detection zones, and
subsequently detecting the heat signature in a third zone of the detection zones; and
control the illumination unit to indicate the availability status.

2. The visual indicator of claim 1, wherein the availability status is determined as available by:
detecting the heat signature in the third zone of the detection zones,
subsequently detecting the heat signature in the second zone of the detection zones, and
subsequently detecting the heat signature in the first zone of the detection zones.

3. The visual indicator of claim 1, wherein the controller includes a switch configured to activate and deactivate zones associated with a field of view of the infrared sensor unit thereby configuring the detection zones.

4. The visual indicator of claim 3, wherein the switch is configured for manual adjustment prior to installation of the visual indicator.

5. The visual indicator of claim 3, wherein the switch is configured for remote adjustment prior to, during, or post installation of the visual indicator.

6. The visual indicator of claim 1, wherein the illumination unit includes a light reflector operable to boost the illuminated color.

7. The visual indicator of claim 6, wherein the light reflector is defined by a conical member.

8. The visual indicator of claim 6, further comprising a diffuser enveloping the light reflector and operable to dim the illuminated color.

9. The visual indicator of claim 1, further comprising a fixing configured to attach the visual indicator to a surface in an elevated position.

10. The visual indicator of claim 1, further comprising a fixing configured to attach the visual indicator to an exposed surface, which encloses a cavity behind the surface.

11. The visual indicator of claim 10, wherein the fixing comprises two retaining springs, wherein, when in use, the springs are located within the cavity and retain the visual indicator against the exposed surface.

12. The visual indicator of claim 10, wherein the fixing includes a plurality of toggle fixings, wherein, when in use, the toggle fixings are located within the cavity and retain the visual indicator against the exposed surface.

13. The visual indicator of claim 10, wherein the controller is configured to provide, to a remote display unit, the availability status, wherein the remote display unit is configured to display the status of each visual indicator.

14. A visual indication system comprising:
a visual indicator comprising:
an infrared sensor unit configured to detect a heat signature of a person passing through a plurality of detection zones configured for a facility; and
a housing comprising an illumination unit operable to display at least two separate illumination colors;
a remote display unit; and
a controller communicatively coupled to the visual indicator and configured to:
receive sensor data from the infrared sensor unit;
process the sensor data to determine an availability status based on the heat signature passing through each of the detection zones, wherein the availability status is determined as unavailable by:
detecting the heat signature in a first zone of the detection zones,
subsequently detecting the heat signature in a second zone of the detection zones, and
subsequently detecting the heat signature in a third zone of the detection zones;
control the illumination unit to indicate the availability status; and
provide, to the remote display unit, the status of the visual indicator, wherein the remote display unit is configured to display the status of the visual indicator.

15. The visual indication system of claim 14, wherein the controller is configured to control the visual indicator to display a first color when the availability status is unavailable and a second color when the availability status is available, wherein the first color is different from the second color.

16. The visual indicator system of claim 15, wherein the availability status is determined as available by:
   detecting the heat signature in the third zone of the detection zones,
   subsequently detecting the heat signature in the second zone of the detection zones, and
   subsequently detecting the heat signature in the first zone of the detection zones.

17. The visual indication system of claim 14, wherein the controller is configured to override the visual indicator to display a third color when the availability is suspended thereby indicating the visual indicator is inaccessible.

18. The visual indication system of claim 14, further comprising a fixing configured to attach the visual indicator to an exposed surface, which encloses a cavity behind the surface, wherein the fixing includes a plurality of toggle fixings, wherein, in use, the toggle fixings are located within the cavity and retain the visual indicator against the exposed surface.

\* \* \* \* \*